United States Patent [19]
McAlister

[11] Patent Number: 6,155,212
[45] Date of Patent: Dec. 5, 2000

[54] METHOD AND APPARATUS FOR OPERATION OF COMBUSTION ENGINES

[76] Inventor: Roy E. McAlister, 216 S. Clark MS 103, Tempe, Ariz. 85231

[21] Appl. No.: 08/785,376

[22] Filed: Jan. 21, 1997

Related U.S. Application Data

[63] Continuation-in-part of application No. 08/268,680, Jun. 30, 1994, and a continuation-in-part of application No. 07/755,323, Sep. 5, 1991, Pat. No. 5,394,852, and a continuation-in-part of application No. 07/990,071, Dec. 14, 1992, Pat. No. 5,343,699, which is a continuation-in-part of application No. 07/364,309, Jun. 12, 1989, abandoned.

[51] Int. Cl.$^7$ ..................................................... F02B 43/08
[52] U.S. Cl. ................................ 123/3; 123/25 B; 60/320
[58] Field of Search ........................... 123/3, 25 A, 25 B; 60/320

[56] References Cited

U.S. PATENT DOCUMENTS

| | | | |
|---|---|---|---|
| 5,207,185 | 5/1993 | Greiner et al. | 123/3 |
| 5,305,714 | 4/1994 | Sekiguchi et al. | 123/3 |
| 5,343,699 | 9/1994 | McAlister | 123/3 |
| 5,357,908 | 10/1994 | Sung et al. | 123/3 |
| 5,394,852 | 3/1995 | McAlister | 123/494 |
| 5,488,932 | 2/1996 | Serafini | 123/25 A |
| 5,692,458 | 12/1997 | Green | 123/3 |

*Primary Examiner*—John Kwon

[57] ABSTRACT

A heat engine system for optionally combining various embodiments selected from those based on fuel injection to induce denser air delivery to a combustion chamber, direct injection of fuel into a combustion chamber, stratified charge fuel combustion, utilization of variable degrees of excess air to control peak combustion temperature, regenerative conversion of kinetic energy into fuel value, positive ignition by spark discharge, catalytic ignition, heated surface ignition, turbocharging, turbogenerating, moisture recovery by exduction, electrolysis, thermochemical regeneration, and electrothermochemical regeneration.

12 Claims, 7 Drawing Sheets

FIG. 3
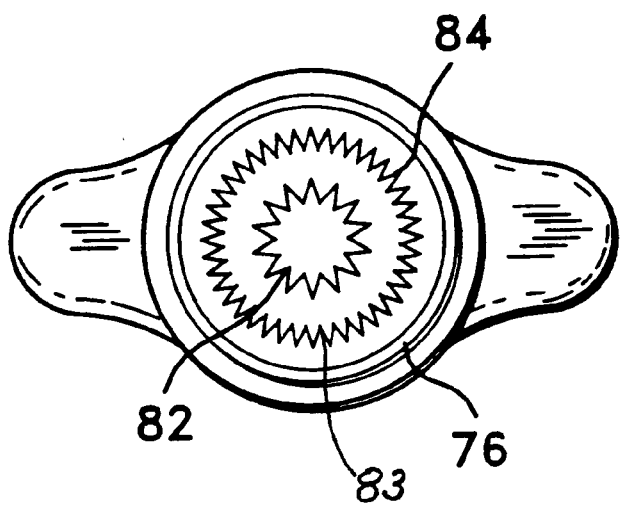
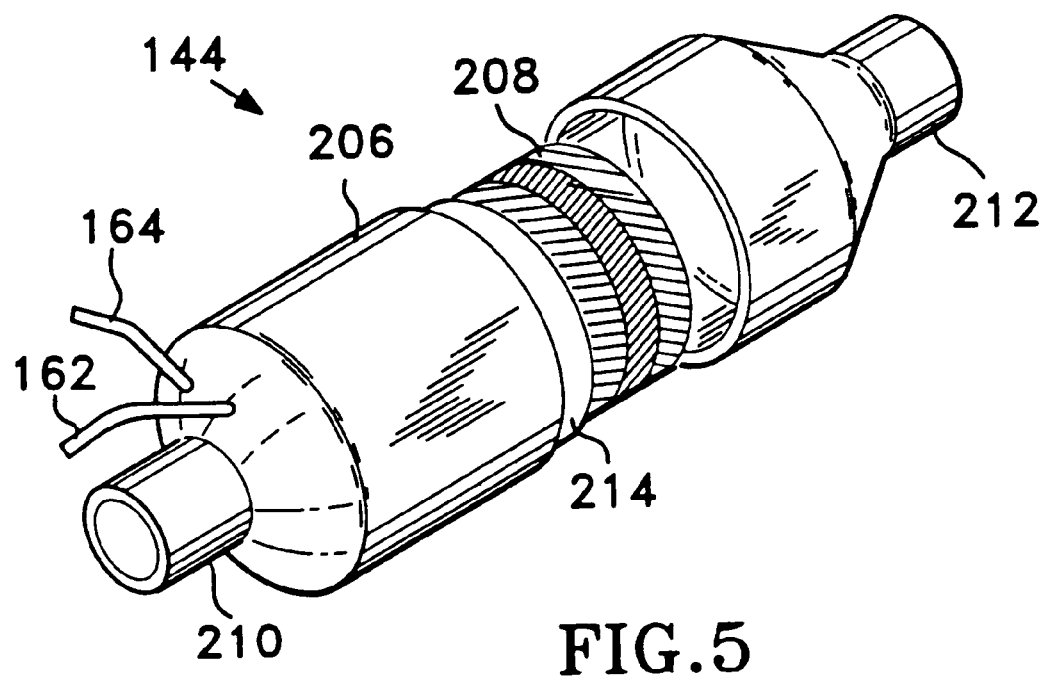
FIG. 5

METHOD AND APPARATUS FOR OPERATION OF COMBUSTION ENGINES

This invention relates to improved operation of internal combustion engines and vehicles powered by such engines. This application filed Jan. 21, 1997 is a Continuation In Part of Ser. No. 08/268,680 filed Jun. 30, 1994; application No. 755,323 filed Sep. 5, 1991, now U.S. Pat. No. 5,394,852 issued Mar. 7, 1995; and Ser. No. 990,071 filed Dec. 14, 1992, now U.S. Pat. No. 5,343,699 issued Sep. 6, 1994; which were Continuations In Part of Ser. No. 364,309, filed Jun. 12, 1989, and later abandoned.

BACKGROUND OF THE INVENTION

There is about one motor vehicle for every eleven persons on Earth. More than 400 million cars and trucks are operated throughout the world. Homogeneous-charge engines power the vast majority of motor vehicles. In these engines it is attempted to develop a homogeneous mixture of air and fuel vapor by fuel injection or carburation into an intake manifold for delivery to the engines combustion chambers. Homogeneous-charge engines present numerous problems including:

1. Unburned hydrocarbons and carbon monoxide emissions are unacceptable from homogeneous-charge engines. These emissions are caused by uncontrolled burning and quenching of homogeneous-charge combustion processes near combustion-chamber walls. All major cities are polluted by oxides of nitrogen, carbon monoxide, and unburned hydrocarbons from homogeneous-charge engines.
2. Another cause of unburned hydrocarbons and carbon monoxide from homogeneous-charge engines is operation at insufficient air to fuel ratios to complete combustion processes at the relatively high piston speeds of modern cars. It is a widespread practice to operate the engine at air-fuel ratios for best power production in spite of the fact that operation at excess-air conditions would produce less unburned hydrocarbons and carbon-monoxide emissions.
3. Oxides of nitrogen emissions are unacceptable from homogeneous-charge engines. Increasing the air to fuel ratio as in homogeneous-charge lean burns operations increases production of oxides of nitrogen to the point of reaching excess air to fuel ratios that are difficult to ignite.
4. Several catalytic processes and an auxiliary air supply are needed to clean-up the exhaust streams of homogeneous-charge engines. Modern cars operating at air-fuel ratios optimized for driveability and minimal oxides of nitrogen require addition of air to the exhaust stream for purposes of catalytic combustion of unburned hydrocarbons and carbon monoxide.
5. Energy waste occurs as a great percentage of the fuel present in a homogeneous charge bums near combustion chamber surfaces. Heat is lost by transfer to the head, valves, cylinder, piston, and rings without doing useful work.
6. Homogeneous-charge engines must be limited in compression ratio to values that prevent detonating ignition and piston damage. Positive ignition is achieved by spark plugs.

Technology which has been accepted for improving the thermal efficiency of internal combustion engines includes the venerable Diesel engine apparatus which relies upon direct injection of fuel into the combustion chamber. This technology is characterized as compressing air to produce sufficiently high temperatures to evaporate, chemically crack, and ignite fuel that is sprayed into the compressed air. Such technology requires fuels with specific characteristics that facilitate "compression ignition". Fuels suitable for compression ignition engines have high "cetane" ratings. Direct-injection, compression-ignition engines often obtain about two times higher miles per fuel-BTU ratings than homogeneous-charge engines in practical duty cycles because of stratified-charge advantages of more complete combustion and reduced heat losses from combustion products to engine components.

A substantial problem with the compression ignition engine is the engine weight penalty that stems from requiring about two times more displacement than spark ignited engines of equal power ratings. In operation, this translates to requirements for a much larger crankshaft, a larger flywheel, a larger engine block, larger bearings, larger starter motors, heavier-duty batteries, larger tires, heavier springs, bigger shock absorbers, and a much larger requirement for critical alloying resources such as molybdenum, chromium, vanadium, copper, nickel, tin, lead, antimony, and the content of manufacturing energy to mine, refine, cast, heat treat and machine Diesel engines than spark-ignited engines. Other difficult if not unacceptable problems include:

1. Diesel engines are notorious for belching clouds of black smoke during stop-and-go duty cycles. Bus and truck emissions of nauseous, burned-oil smelling, black smoke in city traffic are unacceptable in view of recent efforts by virtually every city of the world to find relief from atmospheric pollution due to emissions from motor vehicles.
2. Diesel engines are extremely difficult to convert to oxygenated fuels ($CH_3OH$, $C_2H_5OH$, etc.) or other clean burning fuels (such as natural gas and hydrogen) because such preferred fuels have high octane ratings and low cetane ratings. Diesel engines require a high cetane rated pilot fuel (Diesel fuel) to torch-ignite clean burning fuels that are "fumigated" into the combustion chamber along with air supplies during intake cycle operations.
3. Fumigation of fuels into the combustion chamber along with air during the intake cycle de-rates the engine because the fumigated fuel uses part of the breathing capacity and reduces effective volumetric efficiency of the converted engine.
4. Compression ignition engines are hard to start in cold weather. Cold air and cold engine components rob the heat of compression before temperatures are reached that will cause fuel to be evaporated, chemically cracked, and ignited. Expensive subsystems such as spark-ignited starter engines, glow plugs, electric block heaters, and starter fluid dispensers are used in attempts to overcome the difficulties of starting compression-ignition engines in cold weather. Frequently owners of vehicles with compression-ignition engines opt to keep the engine running day and night in the cold season at whatever fuel expense is incurred rather undergo the ordeal of trying to start a Diesel engine in cold weather.
5. Compression-ignition engines operate best in a narrow range of torque-speed conditions. This is because of the characteristic called Diesel-ignition delay and the requirement to tailor the amount of fuel introduced and timing of fuel introduction with respect to the piston speed in order to avoid needless if not damaging pressure rise during the compression cycle and to avoid energy waste and smoke from late burning during the power cycle.

6. Compression-ignition engines require the use of high cetane fuels with carbon to hydrogen mass ratios of about 7. Such fuels and their products of combustion have large radiant energy losses to combustion chamber walls during burning processes. It would greatly improve thermal efficiency to use cleaner burning fuels that have lower carbon to hydrogen mass ratios and much lower radiant energy losses but such fuels cannot be compression ignited in conventional engines.

7. Friction losses are larger in longer stroked, higher compression, and larger bearing area Diesel engines than in spark-ignited engines of the same power rating. In addition to robbing potential power this requires more investment in expensive alloys, case hardening, heat treatment and wear reducing design considerations than required for spark-ignition engines.

Technology for combining the advantages of spark ignition and stratified charge burning have been demonstrated. U.S. Pat. Nos. 3,173,409; 3,830,204; 3,094,974; 3,316,650; 3,682,142; 4,003,343; 4,046,522; 4,086,877; 4,086,878; 4,716,859; 4,722,303; 4,967,409; and the references cited therein disclose methods and apparatus for producing or introducing fuel directly into the combustion chamber to form a stratified charge mixture of spark-ignitable fuel and ignition of such stratified charges by a spark source. Other published references include "Fuel Injection and Positive Ignition—A Basis For Improved Efficiency and Economy, Burning a Wide Range of Fuels in Diesel Engines" by Davis, C. W.; Barber, E. M.; and Mitchel, Edward, "SAE Progress in Technology Review Vol. II"; Society of Automotive Engineers, New York, N.Y. 10017, 1967, pp. 343–357; "Deutz Converts Operation By Adding High-Tension Ignition System" by Finsterwalder, Gerhard, Automotive Engineering, Dec. 1971, pp. 28–32. Institute of Mechanical Engineers Conference Proceedings, Fuel Economy and Emissions of Lean Burn Engines, 1 Mech E Conference Publications,; Mechanical Engineering Publications, Ltd., London, 1979; Institute of Mechanical Engineers Conference Proceedings, Stratified Charge Engines, 1 Mechanical Engineering Conference Publications 1976,; Mechanical Engineering Publications, Ltd., London, 1977; "An Update of the Direct Injected Stratified Charge Rotary Combustion Engine Developments at Curtiss-Wright: by Jones, Charles; Lamping, H. D.; Myers, D. M.; and Lloyd, R. W., SAE International Automotive Engineering Congress and Exposition, Paper No. 770044, Feb. 1977; Society of Automotive Engineers, New York, N.Y., 1977; "An Update of Applicable Automotive Engine Rotary Stratified Charge Developments" by Jones, Charles, SAE Technical Paper Series No. 820347; Society of Automotive Engineers, Warrendale, Pa., 1982; "Multi-Fuel Rotary Engine for General Aviation Aircraft" By Jones, Charles; Ellis, David; and Meng, P. R., NASA Technical Memorandum 83429, AIAA-u3-1340; National Aeronautics and Space Administration, Washington, D.C., June, 1983. Such prior art suggests the use of lower compression ratios than required for compression ignition engines and it is inferred that engine weight savings would be offered along with a wider range of operation with respect to piston speed and torque requirements. Conmmon problems that such systems present include:

1. Fuel must be mixed with air and delivered in spark ignitable proportions in the spark gap of a spark source at the exact time needed to initiate combustion. This is difficult because of varying degrees of fuel deflection as a result of widely varying velocities of air entry and swirl in the combustion chamber as piston speeds range from idle to full power.

2. Fuel directed towards the spark source from the fuel injector for purposes of producing a suitable mixture of fuel and air for spark ignition invariably reach metallic heat-robbing areas of the combustion chamber around the spark source. This results in combustion process quenching and heat losses through components of the combustion chamber.

3. Spark sources such as spark plugs are prone to fail because of oxidation and excessive heating due to the location they are placed as a result of efforts to place the spark gap as far into combustion zone of the combustion chamber as possible.

4. Spark sources are also prone to become soot coated during portions of the duty cycle and subsequently fail to deliver adequate plasma energy for assured ignition.

5. Widely varying emissions such as hydrocarbons, carbon monoxide, and soot at certain speeds and loads along with excessive oxides of nitrogen at other speeds characterize operation with relatively inert fuels at essential portions of the stop-and-go, city-driving duty cycle such as low-speed acceleration, transient conditions, and full power.

6. Efforts to overcome the problems arising from undesirable fuel-air ratios at the spark source during important portions of the duty cycle have resulted in efficiency-sacrificing practices of air throttling. (See "Exhaust Emission Control By the Ford Programmed Combustion Process: PROCO" by Simko, A.; Choma, M. A; and Repko, L. L.; SAE Paper No 720052, Society of Automotive Engineers, New York, N.Y.)

Another aspect of the problem with such prior art efforts has been the characteristic of requiring complicated, expensive, and highly tuned systems that are adapted to specific fuel properties in order to provide vehicle driveability and to achieve emissions of incomplete combustion and oxides of nitrogen that are acceptable to catalytic clean-up processes in the exhaust stream.

Steam reforming and partial oxidation of hydrocarbons are well-known methods for producing hydrogen. Catalytic steam reforming of light hydrocarbons including natural gas, coal-tar liquids, and petroleum liquids is the least expensive method presently available for producing hydrogen. The use of hydrogen as fuel in heat-engines offers attractive characteristics, particularly including high thermal efficiencies and almost no pollutive emissions.

Efforts to provide technology for reducing the problem of incomplete combustion and to improve thermal efficiency with clean burning hydrogen include the following publications. See U.S. Pat. Nos. 4,253,428; 4,362,137; 4,181,100; 4,503,813; 4,515,135; 4,441,469; "Partial Hydrogen Injection Into Internal Combustion Engines Effect On Emissions and Fuel Economy"; by Breshears, R.; Cotrill, H.; and Rupe, J.; Jet Propulsion Laboratories and California Institute of Technology, Pasadena, Calif., 1974; "Dissociated Methanol As A Consumable Hydride for Automobiles and Gas Turbines", by Finegold, Joseph G., McKinnon, J. Thomas, and Karpuk, Michael E., Jun. 17, 1982, Hydrogen Energy Progress IV, pp. 1359–1369; "Hydrogen Production From Water By Means of Chemical Cycles", by Glandt, Eduardo D., and Myers, Allan I-, Department of Chemical and Biochemical Engineering, University of Pennsylvania, Philadelphia, Pa. 19174; Industrial Engineering Chemical Process Development, Vol. 15, No. 1, 1976; "Hydrogen As A Future Fuel, by Gregory, D. P., Institute of Gas Technology; "On-Board Hydrogen Generator For A Partial Hydrogen Injection I.C. Engine", by Houseman, John, and Cerini, D. J., SAE Paper No. 740600, Society of Automotive Engineers, New York, N.Y.; "On-Board Steam Reforming of Methanol To Fuel The Automotive Hydrogen Engine", by Kester, F. L., Konopta, A. J., and Camara, E. H., I.E.C.E.C. Record—1975, pp. 1176–1183; "Parallel Induction: A Simple Fuel Control Method For Hydrogen Engines", by Lynch, F. E., Hydrogen Energy Progress TV, Jun. 17, 1982, pp. 1033–1051; "Electronic Fuel Injection Techniques For Hydrogen-Powered I.C. Engines:, by MacCarley, C. A., and Van Vorst, W. D., International Journal of Hydrogen Energy, Vol. 5, No. 2, Mar. 31, 1980, pp. 179–205.

Definite advantages have been demonstrated by adding hydrogen to hydrocarbon fuels in spark-ignited and in compression-ignited engines. Combustion is more complete and radiation losses are reduced by decreasing the carbon to hydrogen mass ratio. Difficult and notorious problems include low fuel-storage density, back-firing in the intake system, reduced air-breathing capacity as hydrogen contains much less energy per volumetric measure than gasoline and other hydrocarbon vapors, reduced engine-power ratings, and an increased danger of fire in underhood and hydrogen storage areas.

In addition to powering transportation vehicles, internal combustion engines power many stationery devices. Rising electric rates and urgent needs to improve the air quality in heavily populated areas provide an important opportunity for internal combustion engine powered electric generators and air conditioning systems. Total energy, cogeneration, and hot-tap engine drive systems generally connotate on-site use of the heat rejected by an engine along with the shaft energy to reduce the overall energy consumption and pollutive load on the environment by 40% to 75%. Such systems usually consist of an internal combustion engine, waste heat recovery exchangers to safely interface potable water with cooling jacket water and exhaust gases, and a driven load such as an electric generator or a heat-pump compressor. Problems with such systems include low thermal efficiency of the internal combustion engine, inadequate heat recovery from the heat exchangers and inadequate life of engines. Corollaries of the last mentioned problem are unacceptable maintenance requirements and high repair expenses.

SUMMARY OF THE INVENTION

An object of the present invention is to overcome the problems noted above. In accordance with the principles of the present invention, this objective is accomplished by providing a process for operating a combustion engine which comprises the steps of thermochemically regenerating waste heat rejected by the heat engine by reacting at least one conventional fuel containing hydrogen and carbon with an oxygen donor using substantial quantities of the waste heat to produce a mixture of engine-fuel containing substantial quantities of hydrogen and utilizing the engine-fuel to operate a combustion engine.

Another object of the present invention is the provision of a process for operating an internal combustion engine comprising the steps of reacting endothermically a carbon containing fuel with a reagent containing hydrogen and oxygen to produce substantial quantities of a mixture of carbon monoxide and hydrogen, injecting the mixture directly into the combustion chamber of an engine at a time that is substantially at top dead center and combusting the same to produce more products of expansion than would be present if the primary fuel were individually combusted.

Another object of the present invention is the provision of a process for operating an internal combustion engine comprising the steps of reacting endothermically a fuel containing hydrogen to produce substantial quantities of engine-fuel containing free hydrogen, injecting the engine-fuel into the combustion chamber of an internal combustion engine and combusting the same to produce more products of expansion than would be present if the fuel were individually combusted.

Another object of the present invention is to operate an internal combustion engine with fluid fuels including gases and liquids that may be stored in pressurized containers comprising the steps of injecting the fuel substantially at top dead center conditions of the combustion chambers until the storage pressure is reduced due to depletion of the storage inventory and then injecting the fuel progressively earlier in the compression and then intake conditions of the combustion chambers to facilitate greater range from the fuel storage system.

Another object of the present invention is the provision of a process for operating a combustion engine comprising the steps of electrolysis and or endothermic generation of engine-fuel containing free hydrogen, injecting the engine-fuel into the combustion chamber of a combustion engine to stimulate combustion of more inert or slower-burning fuels.

An object of the present invention is to provide method, apparatus, and a process for monitoring and characterizing the condition of each combustion chamber of a combustion engine.

An object of the present invention is to provide a process for monitoring, characterizing, and controlling direct fuel injection into a combustion chamber for the purpose of minimizing emissions such as oxides of nitrogen, carbon monoxide, and hydrocarbons.

An object of the present invention is to provide a process for monitoring and characterizing the ignition and combustion of fuel that has been injected into a combustion chamber along with combustion of fuel from another source.

An object of the present invention is to provide rapid fail safe operation of a combustion engine.

An object of the present invention is to optimize fuel delivery, combustion, and power development of a combustion engine.

An object of the present invention is to collect water from the exhaust stream and convert the water to hydrogen for use as a fuel.

An object of the present invention is to produce hydrogen by electrolysis for use as a fuel in a combustion engine.

An object of the present invention is to convert kinetic energy of a vehicle into chemical energy by generating electrolytic hydrogen as the vehicle is slowed.

An object of the present invention is to convert waste heat from a combustion engine to chemical energy. An object of the present invention is to facilitate the use of clean renewable electricity in existing vehicles using combustion engines.

An object of the present invention is to use utility electricity to produce hydrogen for start-up and clean operation of vehicles in areas that are sensitive to air pollution.

An object of the present invention is to safely store and regulate the delivery of hydrogen on board a vehicle.

An object of the present invention is to operate a valve to restrict the entry of air to an internal combustion engine for the purpose of occasionally producing an intake vacuum to assist atmospheric pressure boosted subsystems such as power brakes and similar equipment.

An object of the invention is to provide a fast, rugged, and reliable electronic valve for direct injection of gaseous and mixtures of gaseous and fluid fuels.

An object of the invention is to facilitate a variety of operational modes including: ignition of normal homogeneous-charge fuel-air mixtures; to cause stratified-charge flame invasion and ignition of fuel-air mixtures that are too lean to burn by single-point ignition; and to operate engines on stratified-charge fuel combustion within excess air.

These and other objects of the present invention will become more apparent during the course of the following detailed description and appended claims.

My invention may be best understood with reference to the accompanying drawings, wherein an illustrative embodiment is shown.

BRIEF DESCRIPTION OF THE DRAWINGS

FIG. 3 is an end view of the device of FIG. 2 showing the location of ignition electrodes.

FIG. 5 is a perspective view of apparatus for recovering exhaust heat to be used to drive endothermic reactions between fuel and an oxygen donor.

DESCRIPTION OF THE PREFERRED EMBODIMENTS

Figure 1:
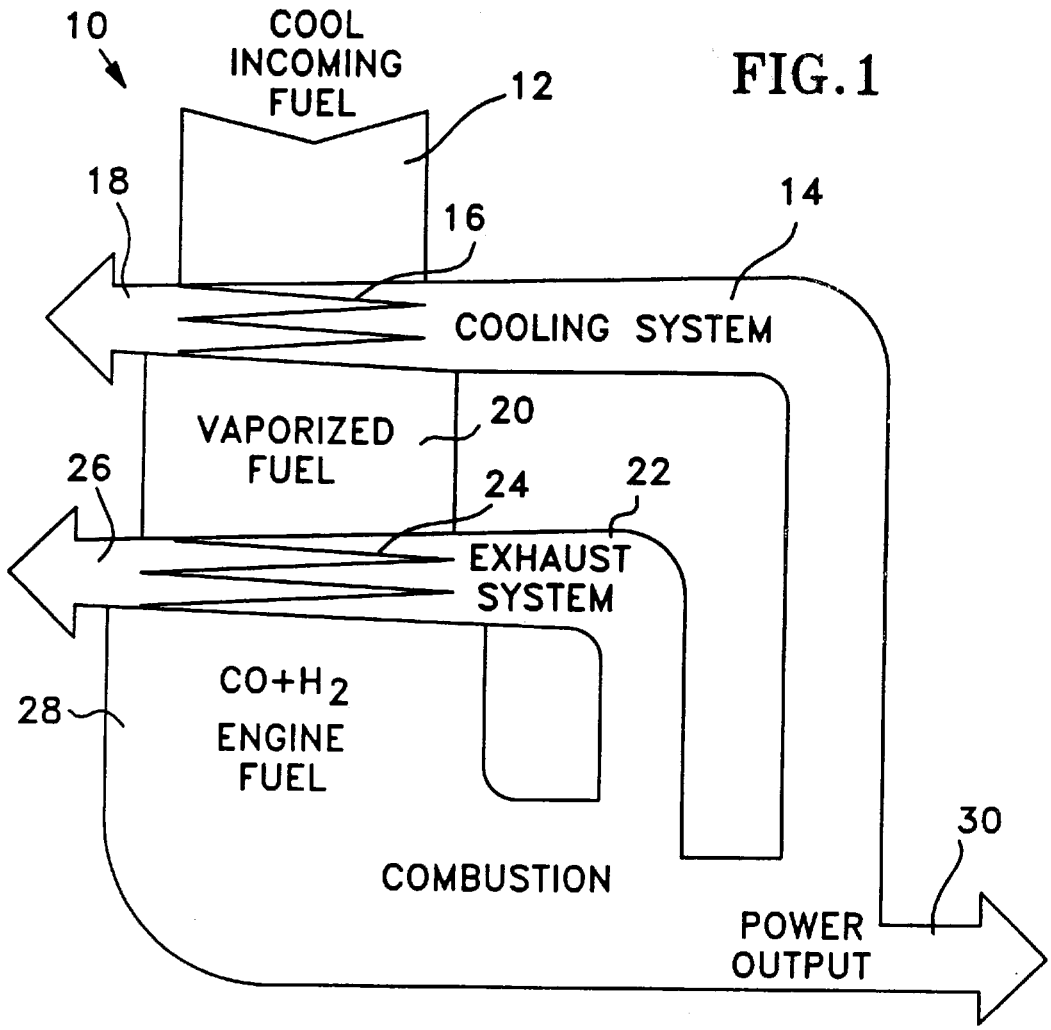
FIG. 1 is a schematic illustration showing thermodynamic processes of the invention.

Waste heat (normally rejected through the cooling, exhaust, and braking systems) is used to supply endothermic heat energy required to drive reactions between a primary fuel and oxygen-donor feed stocks such as air, water or alcohols to produce a preferred fuel called "engine-fuel". This enables 20% to 40% greater heat input to the engine upon combustion of the engine-fuel (and, therefore, 20% to 40% greater vehicle range) than could be delivered by conventional engines directly burning the same amounts of natural gas, gasoline, or fuel alcohol feedstocks. This process is illustrated in FIGS. 1, 4, 7, 8, and 10. In FIG. 1, heat transfer 10 is schematically depicted as energy vectors crossing each other. The width of each energy vector (arrow) generally depicts the magnitude of energy that is represented as heat, mechanical or chemical potential energy. The chemical potential energy of incoming fuel and any other chemical feed stock to be used in the engine is shown as arrow 12. Cooling system heat is shown as arrow 14 which is reduced in magnitude as shown by arrow 18 as a result of heat transfer to incoming fuel at 16. Heated incoming fuel is increased in energy by the heat transfer as shown by arrow 20. Heat from exhaust gases Is transferred to fuel 20 at 24 as shown to reduce the energy of the exhaust gases from 22 to 26 and increase the energy of the fuel to 28 by temperature increases and creation of hydrogen and carbon monoxide as shown in Tables 1 and 2. The engine-fuel 28 is burned in the engine to produce motive power 30 and supplies of waste heat 14 and 22.

Representative temperatures of the processes shown in FIG. 1 are 21° C. (70° F.) at 12; 93° C. (200° F.) at 20; 260° C. (500° F.) at 28; 409° C. (800° F.) at 22; 107° C. (225° F.) at 26; 115° C. (240° F.) at 14; 38° F. (100° F.) at 18. These temperatures vary depending upon the compression ratio of and mode of operation of the engine involved in the application.

Figure 2:
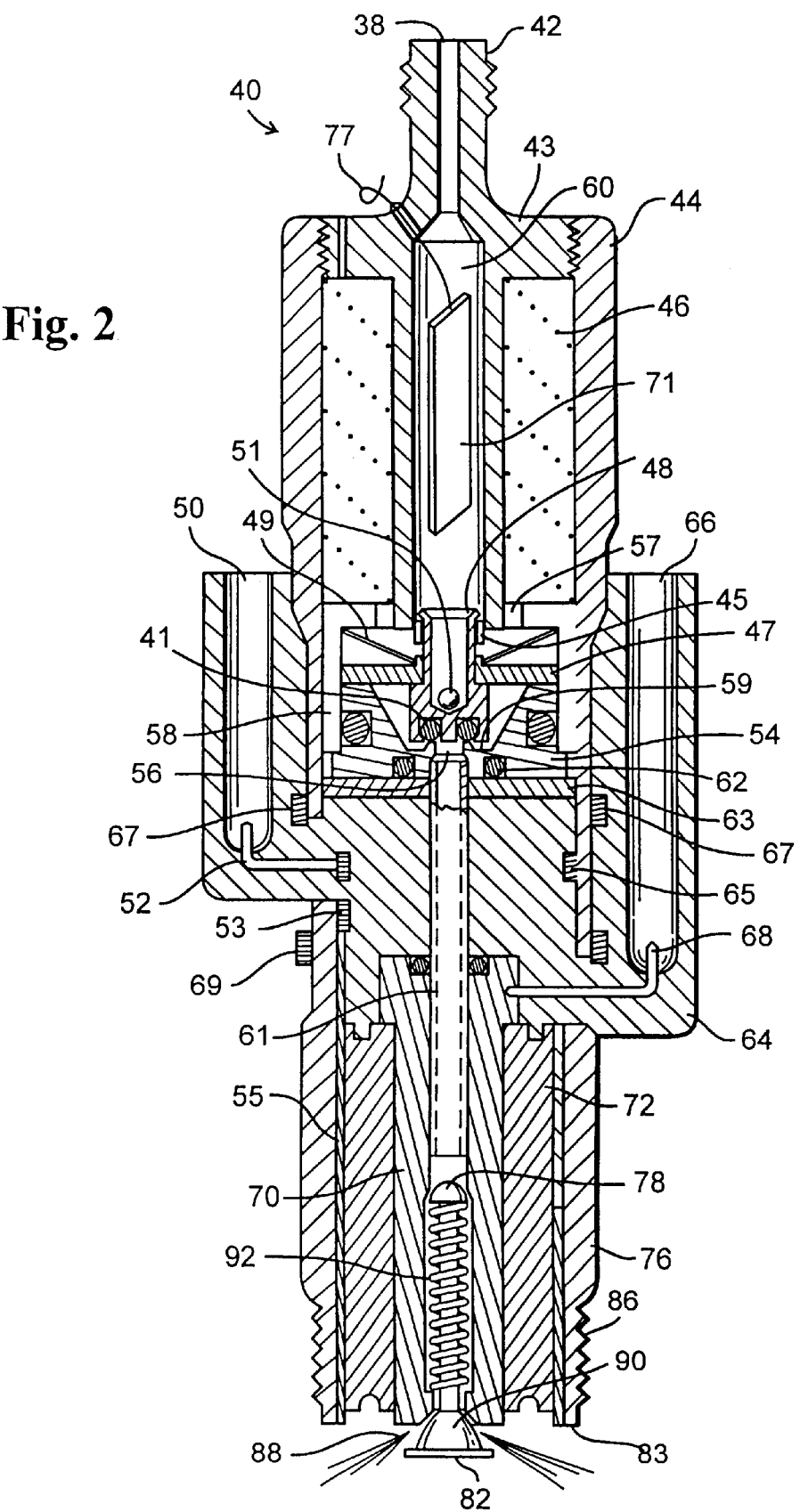
FIG. 2 is a longitudinal sectional view of a device constructed in accordance with the principles of the present invention for directly injecting and igniting fuel in the combustion chamber of an engine.
Figure 9:
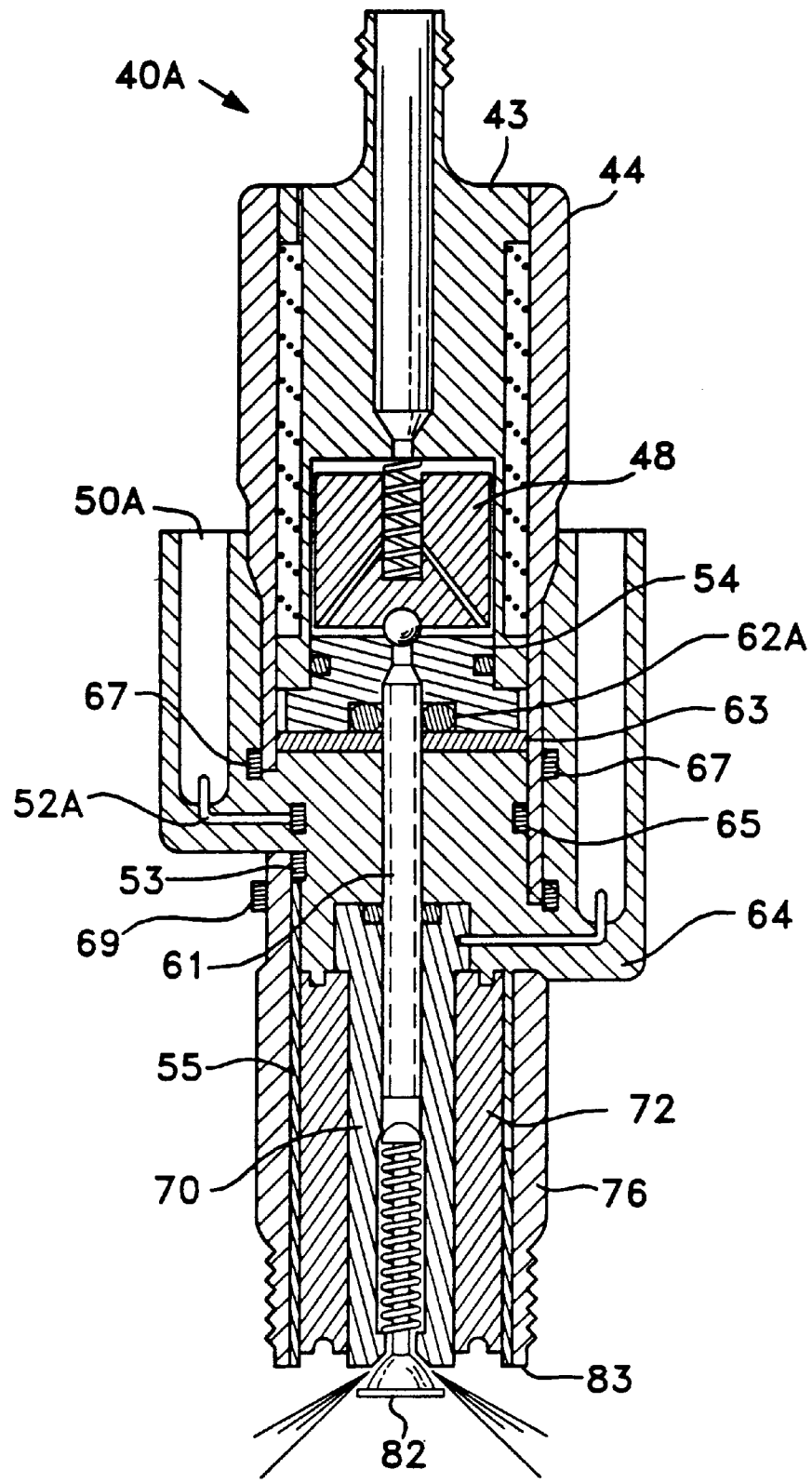
FIG. 9 shows a longitudinal sectional view of a device constructed in accordance with the principles of the present invention for instrumenting engine processes including injecting and igniting fuel in the combustion chamber of a combustion engine.

It is preferred to provide heat exchange between hot engine-fuel at 28 and preheated fuel 20 in instances that large engines using appreciable amounts of fuel are involved. Depending upon the degree of heat-transfer desired, this reduces the temperature of engine-fuel to something approaching the temperature of the engine cooling system and enables a much lower cost construction for the fuel delivery components because thermal degradation factors are reduced. High flame speeds, wide combustible limits, high thermal efficiencies, elimination of particulates, extremely low carbon monoxide and no unburned hydrocarbons characterize engine-fuel combustion results with the invention. These basic advantages are preferably facilitated by the use of a combination fuel-injection and spark-ignition device 40 as shown in FIGS. 2 and 9 to introduce the engine-fuel directly into the combustion chambers of internal combustion engines. Embodiment 40 is provided with the same thread and reach 86 as spark plugs for the engine served by the invention. In instances that the invention is applied to Diesel engines, the design at 86 duplicates the configuration of the conventional fuel injector in the zone that provides a seal to the combustion chamber.

As shown in FIG. 2, pressurized engine-fuel enters embodiment 40 at 38 through fitting 42 and is prevented from entering the combustion chamber as fuel spray 83 until just before pressure increases are needed for the power cycle in the combustion chamber. It is preferred to utilize an inertia disk 47 to strike a valve-seal component for quick opening to flow passage 61. Alternate methods of applying force to accelerate 47 include hydraulic, pneumatic, electrostatic and piezoelectric forces but the preferred method is by electromagnetism. Fitting 42 at the entry of the filter well is part of solenoid body 43 within ferromagnetic housing 44. At the proper time, fuel is allowed to pass solenoid poppet assembly 48 (including integral ring 45, sliding disk 47, and seal 41) which is actuated against conical compression spring 49 by an electromagnetic force resulting from the flow of direct electrical current in winding 46. Fuel control valve 48 is extremely fast acting against high fuel pressures up to 10,000 PSI and can controllably-provide interrupted bursts of approximately one millisecond duration. Poppet assembly 48 is forced away from the orifice in seat 54 which is preferably a dense injection molded ceramic as shown for purposes of electrical isolation of metallic components in valve 48 from high voltage in nozzle assembly 70. Nonmagnetic gap ring 57 is preferably brazed in between ferromagnetic components 43 and 58 as shown to cause densification of the magnetic flux in linear armature 47 when it is actuated. When current flows through insulated coil 46, armature disk 47 accelerates rapidly and is centered by conical spring 49 as it closes the gap with electromagnet 43, 44, 46, and 58 and then strikes the flange ring 45 of poppet assembly 48 which causes 48 to be suddenly lifted from seat 54 to allow fuel to flow through numerous cross holes 51 past elastomeric seal 41 which is preferably an O-ring as shown. Fuel then flows through valve seat 54 and into conduit 61 of a suitable insulator tube and to spray nozzle 70. This extremely fast fluid valving embodiment accomplishes rapid fuel flow past 90 and complete open, flow, and close valve cycles of about 1 millisecond bursts allow adaptive control of the combustion chamber temperature and pressure conditions in response to signals from 52, 53, 55, 62, 63 and 69 along with engine acceleration detection to adaptively meet performance and emissions abatement requirements.

Positive seals such as O-rings 62 are used as shown to seal the fluid delivery path against leakage as shown. Insulator materials 64 and 72 isolate lead 52 which is connected to pressure sensor 65 and high voltage lead 68 which is connected to electrode spray nozzle 70. It is preferred to use injection molded thermoplastic for insulator body 64. Insulator body 72 is preferably a glazed porcelain similar to spark plug porcelain.

Spring 92 urges the check valve head of wire bar 78 closed as shown and 90 closed against the valve seat in 70 to cause the fuel to be sprayed into the combustion chamber as thin sprays of finely atomized fuel 88. This helps the combustion to be rapid and complete upon reaching the oxidant following ignition. High voltage for ignition is delivered by a suitable spark plug wire and terminal 68 in high voltage well 66. Connection 68 delivers the high voltage to conductive nozzle assembly 70.

Water which is found as a contaminant in many fuels causes difficulties ranging from corrosion to freezing and blockage of fuel delivery. Electrode 71 is provided to electrolyze water that reaches filter well 60. Electric current is delivered by insulated lead 77 to 71 which is preferably a formed as a thin walled cylinder with occasional beads of dielectric insulators separating it from the inside walls of 60 in applications where substantial of water contamination is expected. This provision prevents wet gasoline, pipeline natural gas, and other fuels that precipitate condensates from being a problem in multifuel engine applications.

High voltage is carried by compression spring 92 through the wire bar shown to points 82. Spark plasma is developed across the gap between 82 and 83 as fuel 98 is sprayed into air in the gap shown for fuel ignition. Entering fuel is ionized and initiates combustion upon penetration of combustion chamber air. FIG. 3 shows the end view of the gap and spark points 82 and 83.

Poppet 90 is normally at rest against the seat of nozzle 70. Moveable element 90 may be formed in any suitable shape as may the valve seat in 70 to produce the desired spray pattern 88 for the particular combustion chamber that the invention serves. It is the object of spray pattern 88 to produce a great degree of air utilization in combustion reactions while minimizing oxides of nitrogen, unburned hydrocarbons, carbon monoxide, and heat losses from combustion products after ignition.

In application on smaller engines, it is often most suitable to provide a large included angle for a concave conical seat against 90 for use with a convex conical poppet 90 of slightly smaller included angle. This cone within a cone or "cone-cone" check poppet and seat arrangement results in considerably larger surface to volume ratios for fuel entering the combustion chamber than from any number of orifices which are typical to prior art injectors. Fuel entering the combustion chamber is squeezed into a thin coniform layer by the action of spring 92 and dynamic forces of air compression against the air-side of poppet 90. Fuel combustion is extremely fast because of the large surface to volume spray that is presented.

The angle chosen for concave conical seat against 90 is usually optimized for the purpose of directing the conical fuel spray elements along the longest possible path before intersecting a surface of the combustion chamber. Ignition occurs at the beginning of fuel entry into the combustion chamber and continues throughout the time of fuel now into the combustion chamber. This provides the greatest air utilization and the longest burning time for controlled-temperature fuel combustion before approaching a quench zone of the combustion chamber. My invention provides an included angle of entry and variable gap between the seat of 70 and 90 as a function of fuel pressure and viscosity. At maximum torque production, high-speed conditions the amount of fuel delivery is much larger and occurs during a greater number of degrees of crank-shaft rotation. My invention provides optimized air utilization for different flame speeds by providing an included angle for the fuel cone that aims the entering rays of injected fuel at the outer rim of the piston during the highest fuel flow rate of the intended duty cycle.

For optimizing the fuel pattern for hydrogen or engine-fuels produced by reactions such as those in Table 3, the included angle is large and the fuel is aimed at the piston rim at near top dead center. For slower burning natural gas or petrol fuels the included angle is smaller and the fuel is aimed at a piston-rim location somewhat after top dead center. The opportunity is provided to optimize power production for start-up conditions in which a conventional fuel such as natural gas, gasoline or Diesel fuel is burned and then after production of engine-fuel to have extremely advantageous operation including production of more power and better economy than with conventional fuel injectors. It is preferred to form poppet 88 from sheet or tube material and to provide highly angular points on the lower skirt as shown for the purpose of reducing the discharge voltage and temperature during plasma generation. It is preferred to form electrode skirt 83 with highly angular points, as shown, for the same purpose. Alternate geometries of poppet 90 and the form for the valve seat in 70 that are particularly suitable to combustion chambers of larger displacement engines is a spherical form in which the spherical surface of 90 contacts a concavo-spherical seat in 70 of somewhat larger radius. This sphere within a sphere or "sphere-sphere" check poppet and seat arrangement results in a fuel spray cone 88 that tends to provide increased surface to volume and greater air utilization than the cone-cone arrangement described previously. In light-weight engines with high piston speeds, such as racing engines, it is preferred to maximize the flame speed by forcing production of an even greater degree of fuel surface to volume ratio by providing a convex-spherical seat in 70 and a corresponding convex-spherical surface of 90.

In order to achieve satisfactory fuel penetration into the compressed air mass of larger combustion chambers it is advantageous to provide channels (not detailed) in the surface of 90 and 82 and/or in the surface of the seat in 70, and for specialization of the fuel spray pattern 88. These channels carry greater fuel flow than the areas between the channels and provide greater fuel penetration than from areas between the channels. Helical and other patterns of channels that provide acceleration of the fuel at angles with the shortest distance of travel from the orifice in nozzle 70 to the combustion chamber, cause rotation of component 90 which is advantageous in polishing seats 90 and 70 to keep them clean and uniform.

These various cone-cone, sphere-sphere, sphere-cone, cone-sphere, and channel geometries provide important improvements over the prior art. Prior-art Diesel fuel injectors and the injectors anticipated by U.S. Pat. Nos. 1,401,612; 3,173,409, 3,830,204; 3,094,974; 3,316,650 and 4,967,708 utilize sprays of fuel from one or more individual holes to spray fuel into air masses within the combustion chamber, mix with this air and then travel into a spark gap at a critical time that the mixture is spark ignitable. Embodiments of the present invention deliver fuel in a conical form having much higher surface to volume ratio and does so in a pattern that assures completion of combustion events before the fuel reaches quench zones within the combustion chamber. These various embodiments answer the need to optimize air utilization requirements in virtually any combustion chamber design without resorting to efficiency-sacrificing air swirl and/or intake-air throttling techniques.

My invention is applicable to large engines having combustion chamber diameters of 12" or more and to small combustion chambers of the size that is suitable for model airplane use. It is preferred to use ignition devices that are tapered to a point or whiskers that are pointed to decrease the spark discharge voltage requirements on start-up and in some engines to remain at sufficiently elevated temperatures between fuel introduction periods to assure hot-surface ignition without additional spark discharge. Whisker dimensions suitable for the ignition process include 0.13 mm (0.005 inch) to 2,29 mm (0.090 inch) diameter and lengths from 0.51 to 6.35 mm (0.020 to 0.250 inches) depending upon the configuration of the combustion chamber of the engine being served. Suitable materials for tips 82 and 83 include ferrous alloys such as 5 to 6% aluminum, 20 to 25% chromium, balance iron; silicon carbide; molybdenum silicon compounds; cobalt super-alloys; and nickel super-alloys.

In many applications it is desired to reduce spark energy, minimize the use of spark ignition, or to provide ignition without the aid of spark generation equipment. Reasons include avoidance of: spark-sourced oxides of nitrogen, radio interference, and spark erosion of ignition components. This is accomplished by the use of catalytic coatings on the surfaces of the valve seat of 70, 90, 82 or 83. Suitable catalysts include platinum black, nickel black, platinum, palladium, osmium, iridium, nickel, nickel oxide, and intermetallics of transition metals such as vanadium-copper-zinc. It is advantageous to generate hydrogen-as provided in Equations 1–14 for purposes of increasing the thermal efficiency and for cleanly starting the engine on engine-fuel or torching other fuel-air mixtures without spark or with greatly reduced spark energy. Engine-fuel is particularly conducive to reducing oxides of nitrogen because the energy requirement for spark ignition is only 0.02 mWs compared to 0.29 mWs for methane and 0.24 mWs for gasoline. Engine-fuel ignition requires less than 10% of the plasma energy needed for gasoline and other hydrocarbons. This greatly reduces oxides of nitrogen formation at the beginning of combustion and is followed by limitation of maximum combustion temperature by control of the rate of fuel addition and timing of injection and Ignition events to optimize power production, fuel economy, engine smoothness, etc., while minimizing oxides of nitrogen.

Embodiment 40 of FIG. 2 and controller 370 enable many new modes of operation. Illustratively, a cold engine can be started on hydrogen as a stratified charge for cleaning the ambient air while providing greatest fuel economy, then switched to operation of 40 as a spark source for ignition of a conventional homogeneous charge fuel such as gasoline after the exhaust catalysts are heated, and then to switch operation on a combination of stratified charge fuel 88 that is injected from 40 and ignited by 82 and 83 to penetrate with a multitude of burning rays into air-fuel mixtures that are too lean to be ignited by a single spark source.

For clean starting on conventional fuels, tips 82 and 83 may be coated with nickel oxide, cobalt oxide, vanadium oxide or similarly effective materials to catalyze combustion of hydrocarbons by increasing the rate of carbon monoxide formation in oxygen-deficient zones within an overall oxygen-rich reaction. By catalyzing early formation of carbon monoxide in the zone around tips 82 and 83, the overall combustion reaction proceeds quickly into excess air to produce carbon dioxide. Smoke particle formation is virtually eliminated.

In instances where the engine must start and develop emergency power without failure or hesitation, it is preferred to start with spark plasma in the gap between 82 and 83 and to run with application of the plasma ignition until satisfactory power development is indicated. This assures rapid starting and heating of 82 and 83 to ignition temperatures. Applications such as emergency power for hospitals, computers, and chemical processes are examples of such assured applications of the invention. In less critical applications it is preferred to plate points 82 and 83 with coatings such as nickel or platinum-group alloys. In more requiring applications it is preferred to manufacture 82 and 83 from such materials for long-life spark-ignition and for causing catalytic along with hot-surface ignition. Combinations of spark, catalytic and hot-surface ignition provided by these embodiments make the invention suitable for engines of every size, piston speed and application. Depending upon the "cone-sphere" design selected, ignition occurs by fuel air contact with catalytic or hot surface effects on 82 and 83 or due to passage of low-temperature spark-plasma energy through the alternate layers of air, excess-air-fuel zones, fuel-rich zones, excess-air-fuel zones, and air. The greatest flame speed occurs in the surfaces of the fuel-rich zones. Even at the highest piston speeds this creates a fuel-rich, higher-speed combustion-process driver within excess air zones that assures completion of combustion events in slower combustion rate areas.

Figure 10:
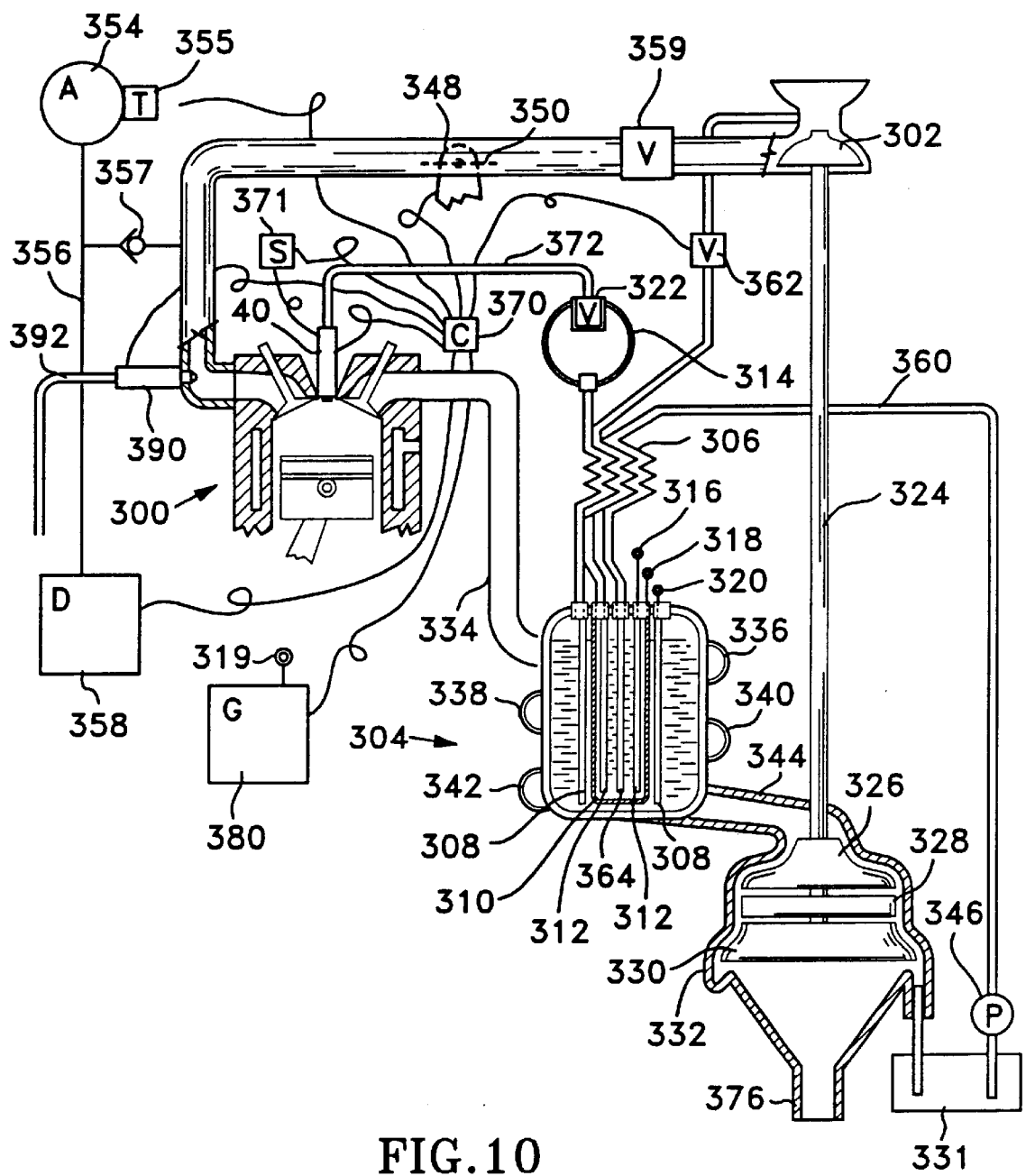
FIG. 10 shows a schematic view of a combustion engine along with control systems for power production, energy recovery, power assisting, and related operations in accordance with the principles of the present invention for producing hydrogen by electrolyzing water and other hydrogenous feedstocks using any of a variety of electrical sources and using the hydrogen as a stratified-charge fuel.

It is preferred to use a spark generator 371 of FIG. 10 that reverse polarity with every spark to reduce spark erosion on 82 and to eliminate high-voltage electrolysis of insulator 64. Spark voltage generator 371 may be of any suitable design for delivering alternating spark current to the gap between 82 and 83 as shown. This greatly improves ignition efficiency and the life of spark-injector 40. Prior art devices depend upon swirl of the air in the combustion chamber to deflect fuel sprays into helical paths in order to prevent penetration to quench zones. Creating swirl of air in the combustion chamber is produced by impedance to air entry. This reduces the mechanical efficiency of the engine by incurring reduced pressure over the piston compared to the pressure under the piston. More mechanical work must be done to overcome the manifold-vacuum condition than if there was no impedance to the air entry. Prior-art approaches depend upon variable air throttling in all practical modes of operation to produce homogeneous mixtures of fuel and air at all levels of power production. In order to be spark ignitable the air had to be throttled so the fuel could be reduced from highest power ratings to lowest power ratings. This type of operation greatly reduces part-load efficiency by increasing the pressure difference through which the piston must operate during intake conditions.

My invention provides multiple sparks and penetration of the combustion chamber with a pattern of burning fuel rays when necessary with varying turbulence and to assure ignition regardless of fuel selections with widely varying viscosity, density, and heat-release characteristics along with widely varying air/fuel ratios. My invention allows unimpeded air entry into the combustion chambers at all power levels for maximum mechanical and volumetric efficiencies. This provides more power, smoother operation without "dead spots", and a greater range of acceptable speed-torque conditions. It is preferred to operate at overall fuel-air ratios ranging from far-excess air at low-power settings to excess-air at higher-power settings. Table 2 shows the limits of flammability, flame speed, and heat of combustion of various fuels including engine-fuel. As shown, hydrogen which characterizes engine-fuel combustion provides more than 7.5 times higher a flame speed than more inert fuel selections. This enables much later injection and ignition of engine-fuel than conventional hydrocarbon fuels and results in greatly improved brake mean effective pressure per BTU of fuel value by not incurring back work during slow-burning pressure rise in the compression cycle of the engine operation.

Engine-fuel combustion is characterized as an extremely-fast combustion process and the degree of heat loss by radiation to combustion-chamber surfaces is much less in comparisons to conventional fuels. The present invention facilitates injecting and igniting engine-fuel just after top dead center (TDC) to provide much quieter operation because piston knock and vibration due to untimely ignition during the compression cycle are eliminated by the invention. Converted engines runs cooler, smoother, quieter and more efficiently than with conventional fuel conditioning and delivery systems.

Figure 4:
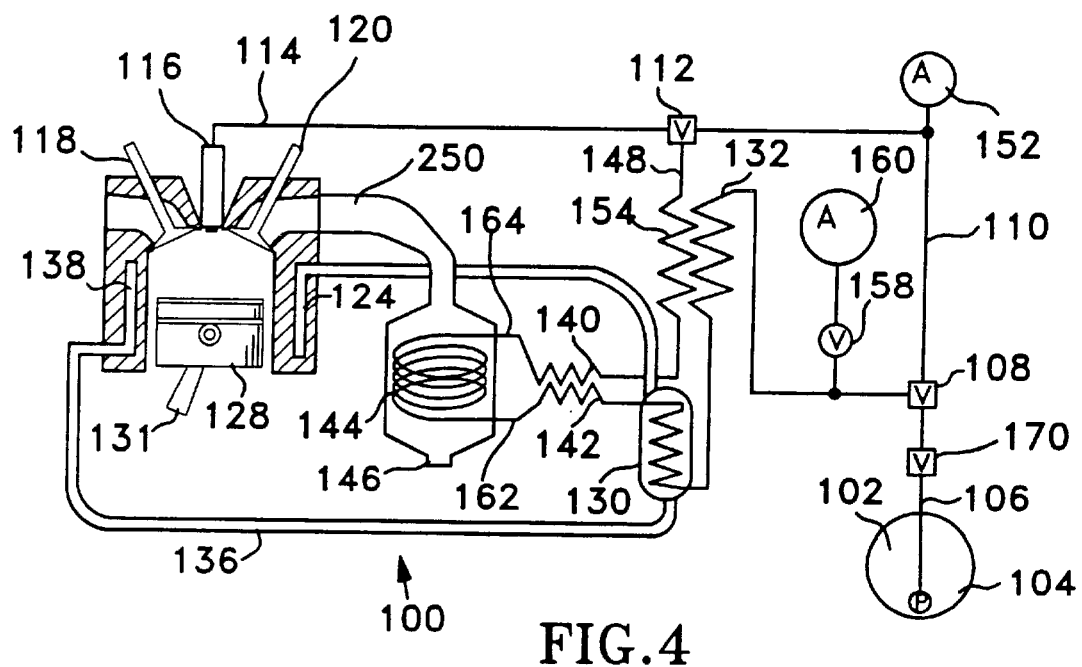
FIG. 4 is a schematic circuit diagram of the invention showing a sectional view of a representative combustion chamber, a cooling system, an exhaust system, fuel storage, fuel pressurization, a cooling system, waste heat recovery exchangers, an exhaust heat recovery exchanger, and delivery of engine-fuel to the combustion chamber.

FIG. 4 shows the method of the invention in a schematic circuit of thermochemical operations. Heat engine 100 which may be any heat engine such as a gas turbine; rotary-combustion; external-combustion Stirling-type engines including Ericsson and Schmidt; or an internal-combustion engine as depicted with any suitable expander such as piston 128 and rod assembly 131 as shown along with intake valve 118 and exhaust valve 120. Fuel is stored at 102. The fuel may be any suitable selection such as compressed natural gas, a suitable fuel alcohol, liquid natural gas, ammonia, gasoline, or Diesel fuel. Liquid fuels stored at ambient pressure are preferably pressurized by pump 104 to required fuel injection pressures, which ranges depending upon fuel viscosity, surface tension, molecular weight, and carbon to hydrogen mass ratio, from about 100 to 1,500 psi above the compression pressure of the engine.

At start-up conditions with positive-displacement engines, cold fuel is delivered to three-way valve 108 and directed to the engine through line 110, three-way valve 112, line 114, and fuel injector 116. Fuel is sprayed into and ignited within all combustion chambers that are about 1% to 70% into power (expansion) cycles. Rapid heating of the air and power delivery results. The engine is started without a starter motor or started much more rapidly if a starter motor is utilized to assure development of oil pressure. After the engine is started, injection and ignition timing are advanced to provide optimum conditions.

It is preferred to use an electric pump in conjunction with the engine's mechanical pump for pressurization of liquid fuels. In instances that the bearing designs require pressurization of oil to the crank and cam shaft bearings before start-up, it is preferred to provide a safety interlock to prevent fuel injection until oil pressurization by a suitable hand or electric pump has been accomplished.

Direct-injection with spark-ignition starting is an important improvement over prior-art methods of starting an engine. It results in much reduced package weight, initial cost savings, and elimination of starter-system maintenance expense. This quick starting system allows the engine to be stopped at stop signs and instantly restarted to power the vehicle when needed. This eliminates waste of fuel and production of pollutants at conditions when power is not needed. It is preferred to use a conventional electronic microprocessor with memory for monitoring, starting, and optimizing the engine. Piston locations within combustion chambers are stored at shut down and recalled for the start-up routine. A suitable microprocessor 370 of FIG. 10 facilitates safe operation by instantaneous monitoring of oil pressure, temperature, vibration, and other vital instrumentation to provide emergency shut-down if the engine has no lubricating oil or if other malfunctions occur.

Compressed gas fuels stored in 102 are pressure reduced from the storage pressure and regulated at the desired pressure of delivery. Fuel injection through 116 is preferably at substantially top dead center conditions until the storage tank 102 is nearly depleted and fuel pressure is reduced below the desired delivery pressure. My invention provides the steps of injecting the fuel substantially at top dead center conditions of the combustion chambers until the storage pressure is reduced due to depletion of the storage inventory and then injecting the fuel progressively earlier in the compression period and then progressively into the intake condition of the combustion chambers to facilitate greater range from the fuel storage system by providing an optimized way to utilize the last portions of stored fuel. After injecting fuel and monitoring combustion chamber conditions as indicated by instrumentation 62A, 63, or 65 in spark-injector 40A of FIG. 9, timing of fuel injection and ignition are optimized for the subsequent injection and ignition events according to the fuel storage pressure available. As the fuel storage pressure is depleted, the timing of injection progresses from near top dead center towards bottom dead center and finally into the intake period of the engine.

After the engine has warmed up and the temperature at thermochemical converter 144 has reached about 500° F., valve 108 shuttles to direct fuel to heat exchanger circuit 154/132 as shown. The engine continues to operate on fuel supplied by accumulator 152. Fuel and any other desired oxygen donor (such as air or the combinations listed in Tables 1 and 2) from tank 160 is pressurized by suitable pump 158 and heated in heat exchanger 130 by cooling fluid delivered from cooling jacket 124 and returned to cooling jacket 138 through conduit 136 as shown. Combinations of fuel from tank 102 and water or another oxygen donor from tank 160 are called "reactants". Further heating of the reactants is accomplished by counter-current exchange between 140 and 142 with engine gas produced in thermochemical converter 144.

Final heating of the reactants and production of engine gas results from catalytic processes in converter 144. Hot exhaust gases 250 ranging in temperature from over 593° to 316° C. (1100° F. to 600° F.) depending upon the duty cycle are delivered to thermochemical converter 144 as shown. Cooled exhaust gases pass through exhaust conduit 146. Cooled jacket fluid is returned to the engine through conduit 136 for circulation through suitable cooling passages 138 and 124. Another heat rejecting circuit comprising an ordinary radiator and thermostatic valve may be used in series or in parallel with the circuit of 130 and 136. Engine-gas is delivered to three-way valve 112 and directed to the engine through line 114 and fuel injector 116. It is preferred to use the combination fuel-injector and spark-ignitor 40 shown in FIGS. 2 and 3.

Figure 6:
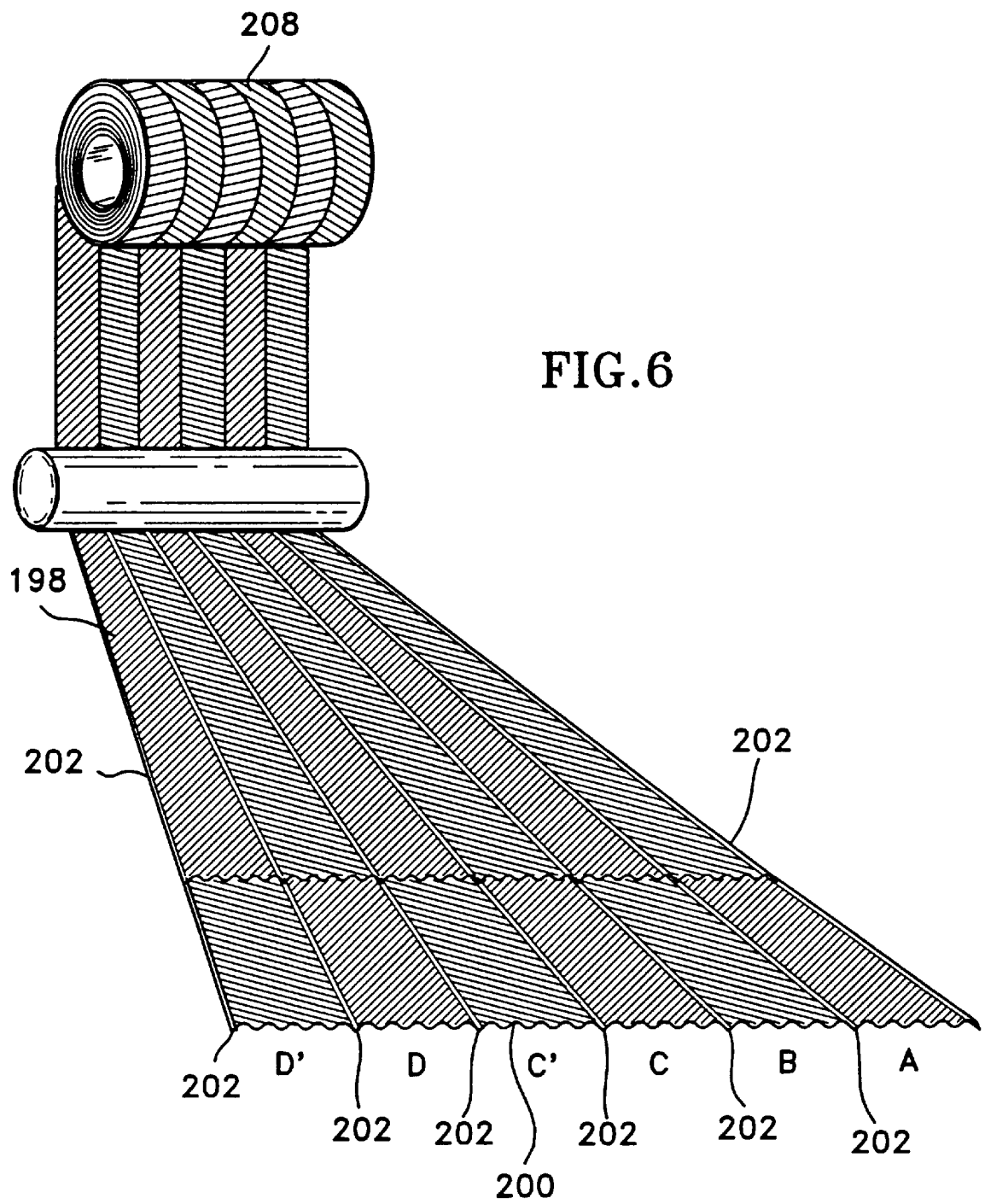
FIG. 6 is a schematic view of details of a preferred heat exchanger tube-fin fabrication technique utilized in accordance with the principles of the present invention.

Details of the preferred embodiment for thermochemical converter 144 are shown in FIGS. 5 and 6. Recovery of waste heat from the engine is provided by passing hot exhaust gases into inlet 210 of canister 206. Heat exchange from hot exhaust gases heats the feed stocks delivered through tube 162. Thermochemically converted engine-fuel leaves reactor 144 through tube 164 and is preferably cooled by regenerative beat exchange to feed stock fluids in heat exchangers 140/142 and 132/154 as shown in FIG. 4.

Heat exchange and catalytic conversion of feed stock fluids within 206 are provided by flat tube coil 208. Tube coil 208 is preferably made from two strips of metal that are formed to provide extremely high surface areas for heat transfer and catalytic actions upon mixtures or solutions of feed stock fluids. One such embodiment 200 for the strip stock is shown in FIG. 6. Strip 200 is formed to have corrugated, knurled, herringbone, or otherwise circuitous surfaces as shown. It is continuously bonded to sheet 198 along seams 202 as shown. Sheet 198 may be formed like 200 or provided as an essentially smooth sheet. A particularly high surface to volume catalytic heat exchanger is formed from sheets 198 and 200 in which each sheet is corrugated to form adjacent herringbone designs in the areas between seams 202 when assembled as shown. The herringbone corrugations of each sheet are opposite the other sheet. This provides parallel internal tube-ways between seams 202 that have circuitous internal channels to force turbulent flow of reactants at all portions of fluid progress through the reactor and turbulent flow of exhaust gases through the corrugated spaces that are provided between formed or rolled layers of the assembly.

Tube ways are manifolded to provide the desired circuits through reactor 144. It is preferred to have counter-current heat exchanges in which the coolest fluid entering the reactor receives heat from the coolest exhaust gases as shown. Fluid nearing the exit of the, reactor receive heat from the hottest exhaust gases. After manifolding the tube-ways, the assembly is spiral wound on a tube and the assembly is encased in insulated canister 206. The spiral-wound assembly is shown in FIG. 5.

Heat additions through catalytic surfaces are preferred to perform the desired reactions of Equations 1–11. The embodiment shown in FIGS. 5 and 6 provides high thermal conductivity with catalytic functions. Sheet materials for reactor 208 may be typical to those listed in Table 4. As shown, a wide variety of alloys and surface coatings for iron, aluminum, and copper based sheet structures are possible. The catalyst selections may have further roles of serving as bonding or sealing agents in the catalytic heat exchangers. After forming, seam welding, manifolding, and coiling, the assembly may be furnace or induction brazed to bond contact areas inside the flat tubes and between layers of flat tubes. This greatly strengthens the assembly.

Sheet strip selections are first plated or hot-dip coated to uniform coating thicknesses by any suitable production line technique and then roll-bonded or seam-welded along the seam zones 202. It is preferred to bond all areas of contact between sheet 198 and 200 to arrest pressure stresses from the fluids within the flat tubes. It is also anticipated that diffusion gradients of desired catalytic agents would be produced by multiple platings or coatings followed by heat treatment.

Although zinc and copper have been recorded in prior art efforts to dehydrogenate alcohols, it is important to note that the present invention uses catalytic alloys of zinc and copper or coatings containing zinc and copper in solid solution to provide heterogeneous dehydrogenation of alcohols, organic solutes, and water more or less simultaneously. A series of intermediate reactions are believed to be responsible for the overall reactions as shown in Equations 1–11. A particularly useful aid to the understanding of intermediate reactions is found on pages 535 through 586 of the Second Edition of the Kirk-Othmer "Encyclopedia of Chemical Technology" and this reference is incorporated herein.

As noted in Table 4, the listed alloy sheet catalysts have considerable ductilities and allow cold working to form turbulence-inducing patterns, such as corrugations or crossed rows of embossments depending upon the hot endurance strength of the selected sheet system at the operating temperature chosen for the application. Sealing the lower sheet to the upper sheet is accomplished by metallurgical joining along 2.29 mm (0.090") wide seams 202 between 25.4 mm (1") wide channels 204. A suitable sheet-stock thickness for strips 198 and 200 of the embodiment of FIG. 6 is 0.25 mm (0.010") with a corrugated channel depth of 0.38 to 1.52 mm (0.015" to 0.060"). This gives a very low clearance volume within the assembled reactor coil, The inventory of engine-fuel is minimized by the low clearance volume in all parts of the fuel conditioning system. To further assure safety, pressure is monitored in lines 106, 110, 148, and 114. If the rate of pressure change exceeds a narrow preset value, pump 104 is stopped and valve 170 is closed to prevent entry of additional fuel to the fuel-conditioning system. Because heat exchangers 130 and 144 are housed in water cooling or exhaust systems, additional fail-safe virtues are provided. If a leak in heat exchanger 130 or 144 would occur pump 104 would shut down, normally-closed solenoid valve 170 would close, and the small inventory of escaping fuel would be contained in water or in the exhaust pipe where it could do no harm. Fuel pressures of 680 atm. at 538° C. (10,000 psi at 1,000° F.) are practical with catalyst sheets having yield strengths of 20,000 psi or more because of the tightly coiled and bonded spiral assembly. An additional aid in arrestment of stress is by transfer of compressive preload from the outer containment by tubular structure 206 as shown in FIG. 5 which is preferably constructed from several wraps of thin strip stock to reduce heat losses and provide high strength.

It is preferred to thermally isolate coil 208 from canister 206 by refractory fiber sleeve 214. This provides an air cooled containment cylinder 206 in which tensile loading occurs to produce compressive loading of coil 208. Use of the insulator sleeve provides a space for 12 mm OD, 2.4 mm wall (½" OD, 0.095" wall) manifold tubing of stainless steel tubing which is also used to convey engine gas to heat exchanger section 130 and to fuel injectors 116. In applications where additional safety considerations are warranted it is preferred to clad tubing 106, 110, 148, and 114 with a sheath of high-strength stainless steel such as 17-7 PH. Inlet manifolding and a core for the spiral assembly is provided by joining the coil to a 76 mm dia., 4.75 wall (3" diameter, 0.187" wall) tube that is internally partitioned to provide desired series flow of vapors through A and B then parallel flow through C and C' followed by parallel flow through D and D' as shown in FIG. 6. Exhaust gases pass into the reactor from connections 210 to 212 to provide a modified counter-current heat-exchanger, endothermic-reactor combination.

Engine cooling jacket water at 82° C. to 121° C. (180° F. to 250° F.) may be circulated in an additional section of heat exchanger 130 to provide standardization of the engine gas temperature. In this instance, the cooling jacket water would be circulated from 124 to 138 through heat exchanger 130 as shown in counter-current arrangement to flow of engine gas. An alternate arrangement for providing desired heat exchanges is to build heat exchangers 130 and 132/154 in one assembly with thenmostatically-controlled engine-jacket water circulation from inlet 124 to 138. In emerging engines with materials that allow combustion-chamber wall temperatures of 260° C. (500° F.) and higher, it is preferred to provide standardization of the engine-fuel temperature with split-phase heat-pipe heat exchangers. Final heat sinking to the vehicle frame, cogeneration heat requirements for air conditioning, and further preheating of feedstock supplies of wet-fuel alcohols are contemplated.

Pressurized engine-fuel from 104 or a suitable regulator is controlled by solenoid-operated, three-way valves 108 and 112. Engine-fuel in heat exchanger section 154 is monitored for temperature and pressure conditions. Valve 112 is operated "OPEN" to allow flow from heat exchanger section 154 to fuel injector 116 if the temperature and pressure are within preset limits. Valve 112 is "CLOSED" to flow from 154 but "OPEN" to flow from pump 104 and provides assured engine start-up and operation with injection of liquid fuel until desired temperatures and pressures are developed in section 154. During operation with liquid fuel, map "A" of the fuel management system is used. During operation with gaseous engine-fuel map "B" is used. Operation between maps A and B is electronically switched in correspondence to the operation of solenoid valve 112.

Fuel entering the combustion chamber is ignited by sparks that pass through alternate layers of air-fuel-air and ignition is assured regardless of the overall combustion chamber inventory of air and fuel. Overall air to fuel ratios of 1,000 to 1 are as assuredly ignited by the invention as are air to fuel ratios of 15 to 1. The invention provides best fuel economy and minimum emissions during cold-engine conditions with direct-injection and spark-ignition of liquid fuels. Later, after reaching the engine's designated operating temperature, the invention provides useful recovery of engine waste heat by operating on gaseous fuels that produce considerably more energy upon combustion than the feedstock liquid fuels. The invention facilitates these fuel efficiency advantages without sacrificing specific power ratings of the engine in power-per-thermal-unit comparisons. This is an extremely important aspect of the invention because it is generally necessary to specify 30% to 150% larger displacements and increased compression ratios (than for carbureted gasoline fuels) when use of gaseous fuel is contemplated. The larger engine requirement cascades into application penalties including:

1. Larger tires, shock absorbers, springs, starter motors, batteries, alternators, power assist units, transmissions, and brakes for a greater curb weight in transportation applications.
2. Greater requirements for iron, chromium, molybdenum, vanadium, manganese, nickel, and petroleum reserves. More energy is required to mine, mill, refine, alloy, cast, forge, machine, and build the larger engines. The greater demands upon finite reserves of critical materials produce higher prices per pound and force inflation in the world's economy.

In addition, the invention overcomes the difficult problems of back-firing and hesitation, wherein hydrogen is inopportunely burned within the intake manifold of carbureted or manifold injected engines. This problem stems from the fact that hydrogen will support combustion in remarkably wide fuel-to-air ratios and because flame speeds in hydrogen combustion are extremely high. The invention prevents back-firing by eliminating any mixing of hydrogen and air until the fuel-injection event within the combustion chamber.

Production of engine-fuel from inexpensive fuel alcohols and compressed or liquid natural gas is facilitated. A longer-range regime would use bio-sourced methane and wet ethanol and methanol. The present invention thermochemically processes and utilizes feed stocks that are less refined and less expensive than gasoline or Diesel fuels including natural gas, crude alcohols, and ammonia liquors as shown in Tables 1–3. Considerable range and thermal efficiency improvements are offered with Diesel and gasoline fuels.

Fuels such as natural gas, coal gas, acetone, methanol, ethanol, propanol, propane, butane, ammonia, and butanol are attractive replacements for traditional petroleum fuels. The fuel alcohols and light paraffins are readily produced from coal, peat, oil shale, tar sands, natural gas, solid wastes, or freshly-grown biomass. Using sewage- and garbage-sourced hydrogen, methane, and fuel alcohols is facilitated and the invention allows petroleum to be used for making more valuable polymers and petrochemicals.

A well-recognized and long-standing problem concerning bio-fuels is the energy-intensive nature of producing fuel alcohols from coal or biomass. Water present in the coal or biomass feed stocks, along with steam used in reactions with carbonaceous feed stocks to gasify the feed stocks requires considerable energy to reach process reaction temperatures. After generation of mixtures of hydrogen and carbon monoxide (water-gas) and catalytic synthesis of fuel alcohols, considerable additional energy often is required to remove water condensates and produce anhydrous fuel.

Commercial production of methanol by the Oxyl process, the action of fermentation enzymes, or destructive distillation of lignin and cellulose could be considerably less energy-intensive if the product could be used "wet" (130- to 190-proof) rather than "dry" (200-proof). My process and apparatus facilitates the advantageous usage of natural gas, wet-fuel alcohols, water-soluble or alcohol-soluble organic compounds, and engine waste heat by the illustrative reactions shown in Tables 1 and 2 and as follows:

WET NATURAL GAS plus WASTE HEAT yields HYDROGEN and CARBON MONOXIDE $$CH_4 + H_2O + HEAT \text{ yields } 3H_2 + CO \quad (15)$$

The reactants in Equations 1–8 of Table 3, consisting of one or more alcohols, one or more soluble organics, and water, are heated by exchange with exhaust gases to temperatures ranging from 107° to 538° C. or 225° to 1,000° F. Hot organic-compound vapors and steam mixtures are passed through a catalyst to produce mixtures of carbon monoxide and hydrogen. Equation 9 illustrates how natural gas or biomass methane is reacted with steam to produce hydrogen and carbon monoxide. Equations 10 and 11 typify the reaction of gasoline and Diesel blends with a liquid containing oxygen to produce carbon monoxide and hydrogen upon endothermic reaction. These reactant blends would also contain emulsifiers for long-term storage purposes. The vaporous product or engine-fuel is used in the combustion chamber as a stratified-charge fuel and is spark-ignited.

Heat-release potentials for complete burning of the engine-fuel constituents exceed the complete burning potentials of the fuel feed stocks by 20% to 40%. Increases in heat-release potentials are derived by exchange from engine waste heat to the endothermic reactions generally shown in Equations 1–14 of Table 3. Equally important is the opportunity to use wet fuels that are 30 to 50% less energy-intensive in initial production than are the anhydrous alcohols, phenol, or other organic-compound counterparts.

Another problem that the present invention overcomes concerns the ability to gain as much power per BTU or calorie of heat release from engine-fuel as gasoline produces in spark-ignited engines. It is generally conceded that gaseous-fueled engines require considerably larger engine displacements than gasoline-fueled engine per unit of power development. This is because previous attempts to use gaseous fuels have mixed the fuel with air during intake processes. Considerable breathing capacity and cycle energy have been diverted to introducing the gaseous fuels into the engine. In the present invention, the full breathing capacity of the engine is reserved for intake of excess volumes of combustion air. Brake mean effective pressures (BMEPs) are higher because: there are more molecules present in the combustion chamber to do expansive work; with more air present, more fuel can be combusted to release more energy; and the pistons are not required to do work (against crankcase atmospheres) in comparison to manifold vacuum.

Water requirements not met by using wet alcohols or other combinations shown in Tables 2 and 3 may be supplied by condensation of water vapor from the exhaust gases of the heat engine employing the invention. Approximately one gallon of water is produced form each gallon of hydrogenous fuel burned by a heat engine. Illustratively, one mole of octane (or gasoline) thermochemically regenerated with eight moles of water burns in air to produce seventeen moles of water. Only eight moles out of the seventeen needs to be recycled:

$$C_8H_{18} + 8\ H_2O \text{ yields } 8CO + 17\ H_2 \text{ ("ENGINE-FUEL")} \quad (16)$$

$$8\ CO + 17\ H_2 + 12.5\ O_2 \text{ yields } 8\ CO_2 + 17H_2O \quad (17)$$

Similarly only one mole of water out of three needs to collected when methane is converted to engine-fuel.

$$CH_4 + H_2O \text{ yields } CO + 3H_2 \text{ (ENGINE-FUEL)} \quad (18)$$

$$CO + 3H_2 + 2O_2 \text{ yields } CO_2 + 3H_2O \quad (19)$$

Condensation ultimately produces liquid water from heat-engine exhaust streams. The familiar plume of condensed water droplets that form in automobile exhaust streams during cold weather is an example of prompt condensation. Rain from clouds and fog are examples of more delayed condensations in which automobile exhaust contributions are added to water evaporated from oceans, lakes, and rivers and to water transpired by vegetation.

In order for approximately half of the water in an engine's exhaust to be recaptured for thermochemical regeneration, most of the exhaust stream must be cooled to approximately 200° F. Assuming daytime high ambient temperatures of 120° F. (and most places would have a lower daytime high temperature), there would be about an 80° F. gradient for heat exchange to the atmosphere. Heat exchanges shown in FIGS. 7 and 8 provide extremely high surface area and turbulence in the heat exchange process to accomplish desired recovery of liquid water by condensation.

As shown in FIG. 6, flat-tube heat exchanger components used in 144 and 256 are self-reinforcing and extremely conservative in the use of corrosion-resistant materials. These designs have been proven capable of extremely rapid fabrication rates. The design regime of FIG. 6 is suitable, therefore, for the high-volume production requirements for automotive applications.

Figure 7:
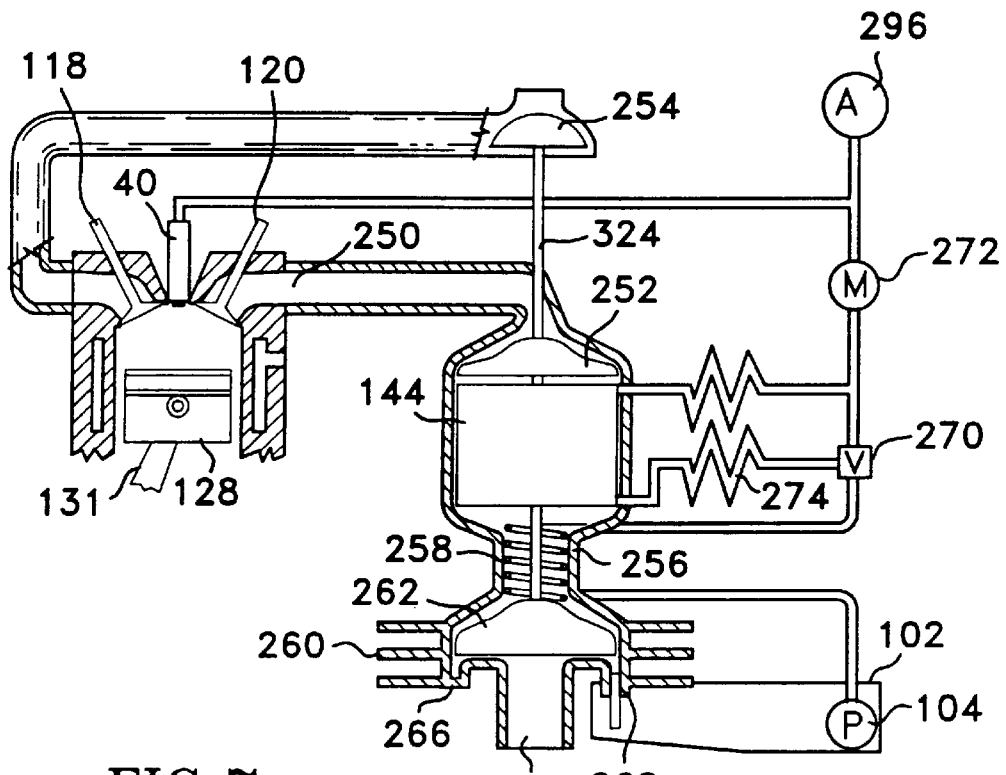
FIG. 7 is a schematic view of one embodiment of an apparatus utilized in accordance with the principles of the present invention for recovering energy and waste water from the exhaust stream of an internal combustion engine constructed in accordance with the principles of the present invention.
Figure 8:
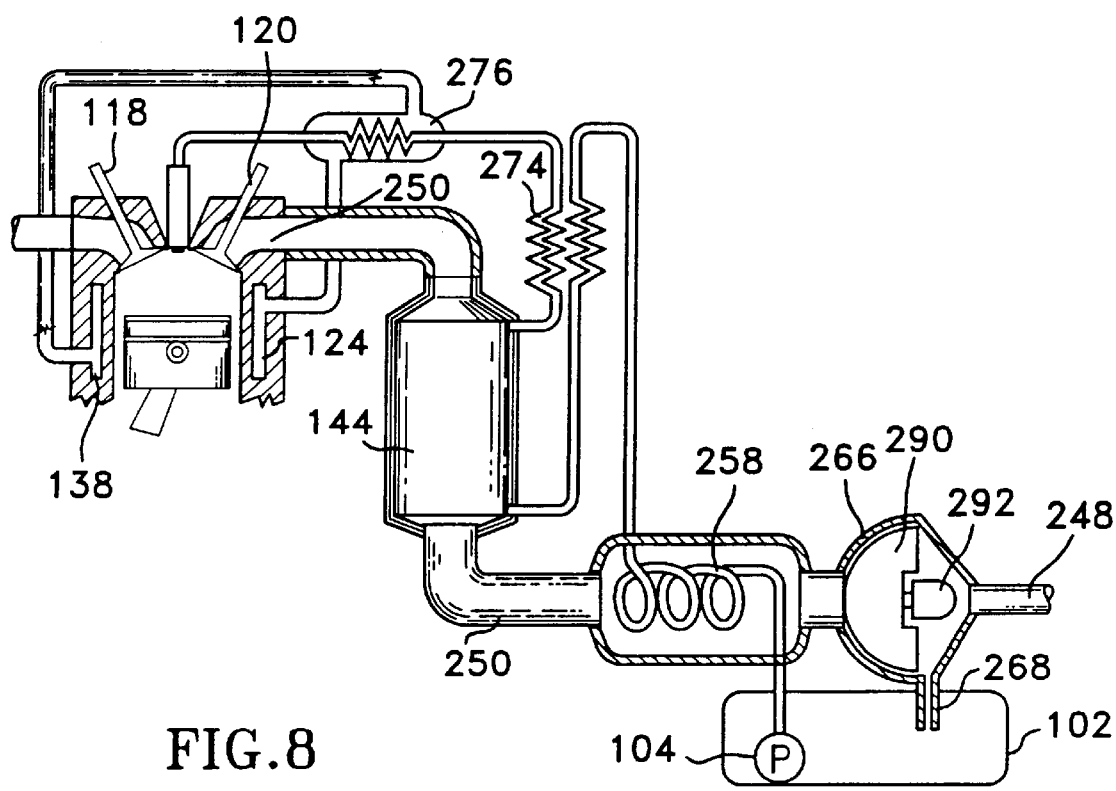
FIG. 8 shows a schematic view of another embodiment of an apparatus for recovering energy and waste water from the exhaust stream of an internal combustion engine.

Collection of water from the exhaust stream is preferably accomplished by the process illustrated in FIG. 7. Exhaust gases 250 from combustion chambers of an internal combustion engine are first used to drive a suitable air motor 252 which in turn drives a suitable compressor 254 to increase the amount of air entering the combustion chambers of the engine. Exhaust gases leaving air motor 252 enter heat exchanger 144 for the endothermic production of engine-fuel. Exhaust gases pass from heat exchanger 144 to heat exchanger 256 for heat rejection to engine-fuel reactants in fin-tube helical coil 258 and to the atmosphere from heat rejection fins 260. A second air motor 262, which is mechanically coupled to air motor 252 and compressor 254 by the connecting shaft as shown, extracts additional work from the expanding exhaust gases and centrifugally accelerates condensed water to collection shroud 266 for delivery of water through tube 268 to tank 102.

As shown, engine-fuel reactants typical to those listed in Tables 1 and 2 are stored in tank 102. Pump 104 delivers reactants to fin-tube 258 of counter-current heat exchanger 256. Reactant fluid is then further heated in regenerative heat exchanger 274 as engine-fuel is cooled by exchange to incoming supplies of feed stocks traveling to enter the coolest region of thermochemical converter 144. Fuel injection and ignition of engine-fuel in the combustion chamber is preferably accomplished by embodiments 40 or 40 A as shown.

Hot exhaust 250 contains all of the water vapor produced by the combustion process. As heat is extracted the relative humidity reaches 100% and liquid water can be extracted by exducer turbine 262. Exducer turbine 262 is preferably made from materials such as carbon-fiber reinforced liquid-crystal polymers that are not corroded or eroded by condensing water droplets. Turbine 252 is preferably made from conventional iron-based superalloys that have traditionally been selected for resistance to oxidation and creep in such applications. Compressor 254 is preferably made from aluminum, magnesium or polymer compounds depending upon the size of the engine and required life of system components.

A particularly advantageous aspect of the present invention is the recovery of waste energy along with the gain in expansion gases compared to compression gases. For the greatest part of the compression cycle only air is present. At the time near top dead center when pressure increase is desired, engine-fuel is injected and combusted to produce far more hot expansion gases than would be present if conventional fuels were used as homogeneous charges or if conventional fuels were injected and burned as stratified charges. This is illustrated by comparison of the processes of the present invention using methane and using engine-fuel derived from methane.

$$CH_4 + 2O_2 \text{ yields } CO_2 + 2H_2O \text{ (one mole of } CH_4 \text{ yields three moles of expansion products)} \quad (20)$$

$$CH_4 + H_2O \text{ yields } CO + 3H_2 \text{(ENGINE-FUEL with 20\% more energy) } CO + 3H_2 + 2O_2 \text{ yields } CO_2 + 3H_2O \text{ (one mole of } CH_4 \text{ yields four moles of expansion products)} \quad (21)$$

The present invention provides a cycle with more molecules of expansion products than compression molecules. This results in greater power ratings for the same engine and increases the thermal efficiency of the process.

It is anticipated that large stationary engine applications with more or less constant speed operation, will place thermochemical reactor 144 in front of power turbine 252 for the purpose of improving the overall thermal efficiency of the system. In mobil applications where it is desired to gain the highest power to weight ratio, it is anticipated that power turbine 252 would be placed in front of thermochemical converter 144 as shown in FIG. 7. In instances that it is not desired to add recovered water to stored fuel feed stocks in tank 102, condensed water from 268 may be added to reservoir 160 as shown in FIG. 4. When the rate of water collection exceeds the desired rate of storage (as is the case in cool weather) heat rejection from fin 260 is attenuated to reduce the rate of condensation to collector shroud 266.

In instances where it is desirable to reduce the thermal signal of heat engines, the invention provides exhaust gas temperatures approaching ambient temperature. This effect may be emphasized by sizing exducer turbine 262 for expansion of the exhaust gases to ambient pressure. This is particularly advantageous in gas turbine engine applications.

Creating carbon monoxide and hydrogen from water and hydrocarbon fuels by regenerative use of engine waste heat provides at least 20% more range and fuel economy. This process virtually eliminates carbon monoxide and unburned hydrocarbon emissions because combustion of engine-fuel is characterized by extremely fast hydrogen burning characteristics to force carbon monoxide to complete combustion processes with excess air to yield carbon dioxide. Improved process efficiencies of the converted engine include:

1. Engine-fuel produces about 20% more heat than burning the feed stock fuel.
2. The invention reduces combustion-radiation losses by converting high-radiation feed stock fuels to low-radiation engine-fuels.
3. Engine-fuel burns about 7.5 times faster than feed stock fuels. This allows the invention to produce a pressure rise that is much faster and to occur substantially at or after top-dead-center conditions. Both mechanical efficiency and thermal efficiency are improved.
4. The invention burns engine-fuel in locally fuel-rich conditions within excess air to enhance high-flame-speed advantages.
5. The invention burns engine-fuel in locally fuel-rich conditions within excess air to reduce conductive losses.
6. Combustion of engine-fuel within excess insulating air assures completion of combustion processes and elimination of unburned hydrocarbons and carbon monoxide.
7. Oxides of nitrogen are greatly reduced by rapid combustion of fuel-rich zones within excess air envelopes under controlled fuel entry rates and local air-fuel ratios that keep peak combustion temperatures below 4,000° F. Controlling combustion lo limit peak temperatures to about 4,000° F. prevents formation of nitrogen-oxygen compounds such as NO. Burning on an overall excess-air stratified-charge basis at temperature limited conditions virtually eliminates production of oxides of nitrogen.

It has been found that the invention provides substantial improvements in thermal efficiency and reductions in undesirable emissions even when only a fraction of the primary hydrocarbon fuel is converted into hydrogen and carbon monoxide. This is especially true in the instance of using alternate fuels such as methane, propane, butane, gasoline, and fuel alcohols. It is very advantageous to use engine fuel as a penetrating stratified charge ignition source for homogeneous charge mixtures of primary fuel and air. The greatest improvements in range and reductions in emissions are gained by injecting mixed engine fuel and primary fuel directly into the combustion chamber and igniting the engine fuel with 82 and 83 as it enters the combustion chamber. Converting some of the hydrocarbon fuel to hydrogen greatly increases flame speed and completion of combustion processes in the combustion chamber. This provides designers with a great latitude in applying the invention to various engine sizes and applications. Heady-work engines using large amounts of fuel such as railroad locomotives would be provided with sufficiently large thermochemical converters (144) to convert essentially all of the hydrocarbon fuel to carbon monoxide for maximum fuel economy. Smaller engines such as those used for lawn mowers and motorcycles might be expected to sacrifice some of the fuel economy potential (offered by total conversion of the hydrocarbon fuel to hydrogen and carbon monoxide) for needed reductions of unwanted emissions.

In instances that the primary fuel selection is satisfactorily vaporized at the temperature and heat input conditions of heat exchanger 256, it is preferred to modulate flow through 144 to maintain optimum operating conditions. Examples of fuels of this type are methanol, ethanol, butane, gasoline, propane, and methane. This is especially helpful in large engines applied in stop and go applications such as a city bus. Three-way valve 270 provides for start-up of the engine on fuel passing directly from heat exchanger 256 to spark-injector 40. Valve 270 preferably provides variable division of flow to heat exchanger 274 and the by-pass circuit to spark-injector 40 as shown. This is done by operating valve 40 as a variable on-time digital flow controller. Fluid is passed through valve 270 to heat exchanger 274 for a short period of time $(t_1)$ and then is passed through valve 270 for a short period of time $(t_2)$. The magnitude of $t_1$ ranges from about 30 milliseconds to full time operation. The magnitude of $t_2$ ranges from about 30 milliseconds to full time operation. The ratio of $t_1/t_2$ provides control of the ratio of engine-fuel to unconverted reagents. The ratio of $t_1/t_2$ may be adjusted in response to the temperature of thermochemical converter 144 or in response to other optimization algorithms.

It is generally desired to provide by-pass flow $t_2$ of at least 4% in each 600 milliseconds of operation after achieving a minimum threshold temperature in 144 for the purpose of inducing turbulence in the channels of 144. After exceeding the minimum threshold temperature in converter 144 it is preferred to operate with full time flow of reagents through 144. Modulation of flow to 144 provides the ability to achieve greatest conversion of reagents to engine-fuel under all duty cycles of the engine.

Static mixer 272 assures that engine-fuel from 144 is evenly mixed with reagent vapors that are by-passed through valve 270. Accumulator 296 provides pressure smoothing of fluids that are modulated by valve 270 and smoothing of pressure variations resulting from transient conditions as the engine is changed in operating conditions. In instances that it is not desired to use an exhaust-driven exducer motor, it is preferred to use an electric motor 292, to drive a water exducer 290 as shown in FIG. 8. Hydrocarbon fuel is added at 266 and mixed with condensate water in 102. Pump 104 pressurizes liquid feed stock stored in 102 and delivers to heat exchanger fin-tube 258. Countercurrent heat exchanger 274 extracts heat from engine-fuel that has been produced in 144. Heat exchanger 276 may be used to standardize engine-fuel temperature by exchange to temperature regulated engine coolant.

Ignition of the stratified fuel and burning in locally fuel rich conditions that are surrounded by excess air dramatically improves combustion rates over lean-burn homogeneous-charge conditions and reduces oxides of nitrogen. Flame characteristics are typical to transparent burning of hydrogen rather than gasoline or Diesel flame fronts. Radiation losses are minimized. Conductive losses are minimized. Resulting thermal efficiencies exceed the gain provided by the endothermic conversion of feed stock fuel to engine-fuel. Compared to conventional operation, improved fuel economy and reduced emissions during cold-engine conditions with direct-injection and spark-ignition are achieved. Later, after reaching the engine's designated operating temperature, the invention provides useful recovery of engine waste heat by operation on engine-fuel that produces considerably more energy upon combustion than the feed stock liquid fuels. My invention facilitates these fuel efficiency advantages without sacrificing specific power ratings of the engine in power-per-thermal-unit comparisons and is applicable to gas turbines, rotary-combustion, and piston engines of two- and four-stroke designs.

A suitable polymer tube 61 such as tetrafluoroethylene as shown in FIG. 2 allows polymer dielectric 64 as shown in FIG. 9 to transmit greater force from bore 61 as a result of pressure differences within the bore 61 and the ambient pressure outside of wall 76 of tube 44. The radial force transmitted to wall 76 by dielectric 64 is met by an equal and opposite force by elastically-strained surrounding tubular steel wall 76 to contain the assembly as shown.

Removal of the ceramic tube 60 also allows polymer dielectric 64 to transmit greater force to valve seat 54 as a result of pressure differences between the compression chamber beyond dielectric 72 and valve seat 54. By providing a force or "pressure" transducer 63 between valve seat 54 and dielectric polymer 64, fuel injection and other events of engine operation can be instrumented. This aspect of the invention is shown in FIG. 9. Especially useful pressure transducers for this purpose are strain gages and piezoelectric including ceramics such as quartz and barium titanate, and polymers such as polyvinylidine fluoride (PVDF). O-ring 62A in valve seat 54 can be made of such material to perform both sealing and pressure transducer functions. Deformation of the material produces a voltage signal that can be monitored to determine fluid pressure within the passage way from valve seat 54 to nozzle 70. Axial force resulting from pressure variations in the combustion chamber is also indicated by piezoelectric o-ring 62A in valve seat 54.

Masking o-ring 62A and metallizing with conductive ink or by sputtering NiCu electrode patterns on the surface of the o-ring allows the voltage signal to be taken out of the assembly by a suitable electrical cable to an external controller. Electrode patterns can be designed to emphasize the signal for fuel pressure monitoring or to emphasize the signal for combustion chamber pressure monitoring or it can be designed to monitor both activities.

For monitoring the fuel pressure signal it is preferred to provide a metallized electrode around the greatest or outside diameter of the o-ring and to provide another opposing electrode at the smallest or inside diameter. The piezoelectric force signal is taken from the outside electrode to a controller outside of the fuel injector 40. It is preferred to make valve seat 54 of a suitable dielectric material such as sintered alumina or other ceramic material however it has been possible to coat metal seats with powder-coated and sintered dielectrics such as perfluoroalkoxy polymer to produce a dielectric coating sufficient to electrically isolate the pressure transducer signal.

In instances that emphasized monitoring of combustion chamber pressures is desired it is preferred to mask the o-ring for application of opposing electrodes on the areas that contact the face of dielectric 64 and the parallel face of the o-ring groove in valve seat 54. This arrangement emphasizes voltage production between the electrodes for axial forces due to combustion chamber pressures.

Another electrode pattern that has been found to be best for monitoring both fuel pressure and combustion chamber pressure is provided by applying the electrodes about half-way between the two locations described above. This provides substantial signal for fuel-injection and combustion-chamber events.

Such piezoelectric material (PVDF) is also available in various thicknesses and dimensions from Pennwalt Corporation, Valley Forge, Pa. 19482. It has been found that a PVDF disc 63 having the outside diametrical dimension of the bore of case 44 at the location of valve seat 54, an inside bore dimension of the O-ring gland as shown, and a thickness of about 50 micrometers serves well as a fuel-pressure and combustion-chamber monitor. It is preferred to apply electrodes to the faces that contact valve seat 54 and dielectric 64.

In the instance that a piezoelectric disk 63 is used it is preferred to select the material for making dielectric body 64 with sufficient Poisson displacement from forces exerted by fuel pressure to develop a substantial anal force and resulting piezoelectric signal on transducer disc 63. In this instance it is preferred to select a relatively low modulus of elasticity material such as unfilled ethylene tetrafluoroethylene rather than a stiffer material such as glass-filed polyphenylene sulfide.

Another suitable form of piezoelectric sensor is a right circular cylinder such as 65, 67, or 69 located as shown in FIG. 9. Cylindrical piezoelectric transducers are available in outside diameters of 6.35 to 25.4 mm (0.25" to 1.00") with nominal wall thicknesses of 0.51 to 1.27 mm (0.02" to 0.05M) and in cylindrical lengths up to 300 mm or 12". Such devices can be special ordered from Atochem Sensors, P.O. Box 799, Valley Forge, Pa. 19482. Pressure transmitted from fuel passing through tubular space 61 and combustion-chamber pressure cycles cause piezoelectrics 65, 67, or 69 to generate electrical signals. Pressure rise and fall in the combustion chamber is transmitted through component assembly 55, 70, 72, and 64 to generate piezoelectric signals on transducers 62A, 63,65,67 and 69. This allows monitoring the combustion chamber to determine operating conditions such as intake, compression, power, and exhaust Determining the approach to top dead center and the trend in piston speed as a result of fuel injection and ignition characteristics allows rapid optimization of fuel-injection and spark-ignition. This approach to pressure measurement and characterization of piston speed, fuel injection, ignition, and combustion provides faster and much more comprehensive control and optimization of engine processes than conventional approaches of instrumentation and control.

In operation, force transducer 63, force-detecting O-ring 62, or transducers such as 65 are monitored by connection of their electrodes to a suitable electrical circuit for determining the occurrence of piezoelectric signals. Other suitable pressure transducers for determining the condition of combustion chambers served by the combination fuel injector and spark ignition device of FIG. 9 include:

1. Fiber optic devices in which an interferometric cavity resonator is located between the end face of an optical fiber and a thin reflective silicon wafer chip. The chip acts as a diaphragm and flexes with differential pressure or with motion of surrounding materials that deform as a result of pressure within the fuel conduit and due to pressure within the combustion chamber. This flexing of the diaphragm changes the cavity depth as a function of the diaphragms radius and modifies the overall spectral reflectance of the light relative to the pressure. Any of four basic variables of intensity, frequency, phase, or polarization may be selected to sense pressure by this fiber optic instrumentation. Intensity modulation is a simple illustration in which the total intensity of reflected light indicates the pressure of the fuel conduit and the combustion chamber. A suitable source for such a device is Fiber Optic Sensor Technologies of Ann Arbor, Mich.

2. Polysilicon piezoelectric gage elements bonded by chemical vapor deposition or molecular bond adhesion to a temperature matched substrate such as tube 60 of FIG. 2, or to the face of seat 54. Such devices are available from Rosemount, Inc. of Eden Prairie, Minn., and from Dresser/Ashcroft of Stanford, Conn.

3. Capacitance sensors with two-way transmitters using fiber optics, smart, or fieldbus communications. All versions use a microcapacitance silicon sensor. Such devices are available from Fuji Instruments, Ltd. of Tokyo, Japan. See FIG. 9 regarding 55 as a fiber optic coupling arrangement.

4. Ceramic diaphragms may be used in capacitance pressure sensors. Pressure sensors of this type are suitable and are available from Endress+Hauser Instruments of Greenwood, Ind.

5. Tuning fork instrumentation to determine pressure as a change of frequency is suitable and such pressure transducers measure the natural frequency with piezoelectric elements. Such devices are available from Yokogawa Corporation of America in Newman, Ga.

6. Fiber optic devices in which the intensity of reflected light is modified by a pressure deformable metallized mirror. The end of the fiber is fitted with a diaphragm having a reflective surface that acts as a variable reflector. The diaphragm flexes with differential pressure or with motion of surrounding materials that deform as a result of pressure within the fuel conduit and due to pressure within the combustion chamber. This flexing of the diaphragm changes the amount of reflected light as a function of the diaphragm's radius and modifies the overall spectral reflectance of the light relative to the pressure.

In operation, transducer 63 develops a signal in response to pressurize increases within bore 61 as fuel passes to the combustion chamber. Detection and characterization of this fuel flow is an important diagnostic step in assuring precisely timed delivery of the fuel to the combustion chamber and in optimization of engine control. Combustion chamber events including intake, compression, stratified-charge fuel introduction, ignition, combustion, and expansion are monitored by one or more pressure transducers 62A, 63 and 65. It is preferred to control some engines with a behavior-based approach such as the Neuronal Group Selection disclosed by Wade O. Troxell in a "A Robotic Assembly Description Language Derived from Task-achieving Behaviors" Proceedings, Manufacturing International '90. Atlanta, march 1990; and by Tim Smithers and Chris Malcolm in "programming robotic assembly in terms of task achieving behavioral modules" DAI Research Paper No. 417, Edinburgh University, Department of Artificial Intelligence, 1998; and by D. B. Killelson, M. J Pipho, and L. L. Franklin in "Dynamic Optimization of Spark Advance and Air-Fuel Ratio for a Natural Gias Engine" SAE paper 892142 in SP-799 Gaseous Fuels: Technolog and Emissions, Society of Automotive Engineers, 1989. These references being incorporated herein. High speed engines driving lawn mowers, motor cycles, and hand tools that undergo rapid changes in speed and load are examples of instances where dynamic optimization is preferred.

Advantages of the invention are also beneficial in combination with more traditional Adaptive Control Techniques by providing a very fast analysis of operations and trends. This fuel-injection and combustion-chamber information provides a much more intimate and instantaneous picture of engine operation than previous instrumentation. With instantaneous information, extremely rapid adaptive control optimization occurs for fuel injection and ignition parameters such as delivery timing, pressure, and penetration pattern. These parameters can be managed by the engine controller to produce very high fuel efficiencies and minimal oxides of nitrogen by plasma ignition of entering fuel in fuel-rich mixtures followed by completion of combustion in far excess air conditions with the result being reduced peak combustion temperature, reduced oxides of nitrogen, and faster completion of combustion to fully oxidized products of combustion. Application of the invention with adaptive control techniques is preferred in engines that operate for long periods with relatively slow changes in load and speed conditions. Examples are locomotives, barges and air planes in which the engines operate with relatively slow changes in load conditions and where two or more engines may be coupled to the same load and require speed matching. Fuel flow is compared to the flow and combustion results in other combustion clambers and is varied to produce the maximum brake mean effective pressure for the least fuel consumption and least emissions of pollutants. In addition to optimization, the invention provides extremely rapid fail-safe monitoring to prevent damage to an engine due to a stuck open fuel control valve. For instance, if valve 48 or 82 should stick open the fuel pressure discrepancy in 61 would be immediately detected and characterized as an abnormal event and the fuel supply could be shut down or brought to a reduced pressure by controller 370 as shown in FIG. 10 in a small fraction of the time that conventional control systems require. Excess fuel flow would be detected before other conventional instrumentation could detect a speed change in the crank shaft. This is an extremely important safety-assurance feature.

In conventional control systems for electronic fuel injection a stuck-open fuel control valve in a multiple cylinder engine would go undetected at least until the crank shaft or cam shaft changed speed and probably for many revolutions before being detected. In the present invention it would be detected in the first abnormal fuel pressure occurrence and the controller could determine the optimal course of action to accomplish the desires of the operator for best safe performance. Corrective action would occur on the next combustion chamber ready for fuel injection, ignition, and power production.

Determination of discrepancies such as low fuel pressure are also provided by the present invention. Partial plugging of individual fuel filters for each embodiment 40 can be compensated by providing longer fuel flow times in such combustion chambers. This aspect of the invention provides compensation or correction of partially performing subsystems long before a change in engine performance could be detected by conventional approaches. By directly injecting fuel into each combustion chamber, correctional operation and maintenance of desired engine speed and torque production can be achieved much more rapidly than with previous approaches to fuel management in which homogeneous air/fuel mixtures are prepared in the intake system of the engine.

As provided in FIGS. 7 and 8, water is recovered from the exhaust stream of a combustion engine. This water can be electrolyzed to produce hydrogen. Any suitable electrolyzer may be used including types that allow production of mixtures of hydrogen and oxygen A summary of electrolysis technology is found in the article "Intermediate Temperature Water Vapor Electrolysis" by M. Schriber, G. Lucier, J. A. Ferrante, and R. A. Huggins, Int. J. Hydrogen Energy, Vol. 16, No. 6, pp. 373–378, 1991, and is incorporated herein. For vehicles that need peak engine performance by utilization of as much exhaust energy as possible in turbocharging the electrolyzer disclosed by J. F. McEloy in "SPE Regenerative Fuel Cells For Space and Marine Applications" pp. 282–285, Fuel Cell Seminar, November 1990 is preferred. It is preferred to use the embodiment shown in FIG. 10 to reduce electrical energy requirements by recovery of waste heat.

Oxides of nitrogen are greatly reduced by using the instrumentation described and adaptive control system of FIGS. 9 and 10 for monitoring rapid combustion of fuel-rich zones within excess air envelopes under controlled fuel entry rates and local air-fuel ratios that keep peak combustion temperatures below 4,000° F. Controlling fuel admission rate and ignition timing can limit peak temperatures to about 4,000° F. and prevents formation of nitrogen-oxygen compounds such as NO. The invention makes it possible to correlate combustion pressure rise characteristics as detected by sensors 62A, 63, or 65 with peak temperature determination by a suitable light pipe 55 which conveys combustion chamber radiation to suitable photodetector 53. As shown light conducting material such as quartz, glass, or sapphire in the form of a fiber or coaxial sleeve 55 conveys light emissions from combustion to photo-electronic sensor 53 to monitor combustion as a function of the fuel characteristics, pressure of delivery, rate of fuel delivery, timing of injection, and timing of ignition. This information may be used as the individual control parameter or in conjunction with other sensors previously disclosed including 62, 63, 65, 67, and 69.

Preventing the temperature of combustion from exceeding 4000° F. is achieved by controller 370 as shown in FIG. 10 using feedback from one or more sensors 62, 65, 53, and/or 55 in the embodiment of FIG. 9. In high production engines it is sufficient to determine the operating parameters for each fuel selection in particular engines through dynamometer testing of power and emissions characteristics and development of a safe envelope of operating parameters including feedback from 62A, 63, or 65 which is compared with values from memory of the electronic controller as a map which has been previously referred to as Map A, Map B, and so forth. Burning on an overall excess-air stratified-charge basis at temperature-limited conditions virtually eliminates production of oxides of nitrogen. Engines utilizing the present invention can be optimized for minimizing oxides of nitrogen while achieving best economy. Adjustment of the fuel-injection initiation timing, fuel-flow rate, and ignition timing with respect to the fuel-combustion characteristics, compression ratio, geometry, and dimensions of the combustion chamber allows production of optimum results such as minimum oxides of nitrogen, maximum power, maximum fuel economy or minimum operating noise. Feedback of the resulting temperature of combustion, piston speed, pressure rise, and presence of oxides of nitrogen in the exhaust allows adaptive controls to precisely control the engine.

Suitable photo-electronic sensors 53 for determining the combustion chamber temperature include light-actuated semiconductors such as photo-diodes, photo-transistors, and photo-resistors. It is preferred to communicate such devices to the combustion chamber through a light pipe to the combustion chamber. It has been found to be suitable to locate such devices 53 at the light gathering apex of a truncated concentric light transmitting dielectric sleeve 55 within the protective mass of dielectric 64 as shown in FIG. 9. Light pipe sleeve 55 extends to the combustion chamber as shown to gather light for sensor 53. It is preferred to make light pipe sleeve 55 from a suitable high-temperature material such as glass, quartz, or sapphire. The signal produced by combustion-chamber monitor 53 is preferably taken to controller 370 by an internal connection 52A through a well in dielectric 64 similar to the one shown at 50 with a suitable connector 52A similar to 52 as shown in FIGS. 2 and 9. Instrumentation-connector wells such as 50A, 50B, 50C (similar to 50 and SOA but not shown) for transmitting instrumentation signals from 53, 62A, 63, 65 and 67 are preferably arranged as needed at suitable heights and circumferentially rotated positions between 50 and 66 to allow ease of installing connecting leads to controller 370.

In many vehicles approximately 50 percent of unwanted exhaust emissions occur at start-up and during cold engine conditions. Hydrogen can be generated by electrolysis or thermochemical regeneration and stored for use during cold-start conditions to prevent such pollution. Waste heat from a combustion engine usually exceeds the energy converted to shaft works This waste heat can be used in endothermic electrolysis or endothermic thermochemical or endothermic electrochemical conversions to reduce the electrical energy required for electrolysis. Accordingly, electrolysis of mixtures of substances shown in Table 3 such as water and ammonia illustrates endothermic electrochemical conversion. FIG. 10 shows an apparatus for elevated temperature electrolysis. In remote locations especially where water is scarce, or for driver convenience in any location or climate it is preferred to use water in the electrolysis, thermochemical, and electrothermochemical processes that has been recovered from the exhaust stream of the combustion engine by embodiments such as those shown in FIG. 7 or FIG. 8.

In operation of the embodiment of FIG. 10, a combustion engine 300 depicted generally as a piston engine as shown operates with a supply of air from inlet compressor 302. Following combustion, exhaust gases travel to cylindrical electrolyzer 304 for purposes of heating the electrolyzer. Water from a suitable source is added to the electrolysis cell 304 after heat exchange in 306 with elevated temperature hydrogen and oxygen from electrolysis cell 304 as shown in FIG. 10.

Electrolysis is carried out within 304 using direct current applied to concentric right circular cylinder electrodes 308 and 312. Semipermeable membrane cup 310 separates concentric chambers within which cylindrical electrodes 308 and 312 are located. An eutectic of NaOH and KOH salts provides a suitable electrolyte for the innermost chamber where water is added from tube 360 to conduit 364 and where concentric oxygen electrode 312 is located. The same electrolyte may be used in the outer chamber, however lithium hydride, potassium chloride, sodium chloride, and lithium chloride form suitable eutectic salt electrolytes for the surrounding chamber in which concentric hydrogen electrode 308 is located. Temperatures above about 177° C. or 350° F. (or the maximum exhaust temperature) are suitable for operating the electrolyzer. Suitable electrode materials are type 302 stainless steel for 312 and nickel screen for electrode 308. Membrane 310 can be made of any suitable proton or hydrogen ion permeable material including materials designed for electrodialysis such as those based on inorganic materials such as ceramics or metals that provide oxidation and hydrogen-embrittlement resistance. It is preferred to use a thin membrane of silver-palladium which serves as a common negative electrode to both electrodes 312 and 308 in instances that long life is mandatory. For automotive applications it is sufficient to use palladium coated iron-nickel and iron-manganese alloys such as the austenitic steels.

Positive voltage is applied to each electrode 308 and 312 through lugs 320 and 316 as shown. Negative voltage is applied to lug 318. It is preferred to use several electrolyzers like the unit cell shown in series or built up with concentric electrodes connected in series to provide a full load for higher voltage systems such as 12–240 volt systems. Each electrolyzer unit cell requires about 1.1 to 1.5 volts depending upon the temperature of operation.

Electricity for operation of electrolyzer 304 may be generated by one or more on-board generators 380 through typical output 319, 319A, 319B etc. connected to 318, or it may come from rectified utility grid power (not shown) during times that the vehicle is parked at facilities for charging. It is preferred to use electricity generated by "braking" generator(s) 380 during times that the vehicle is decelerated. Illustratively, converted Diesel-electric locomotives can use the braking action of the wheel drives to deliver electricity to electrolyzer 304 to recover braking energy. When deceleration is desired, the regenerative brakes are applied and these generators develop electricity for electrolyzer 304. This provides recovery of vehicle kinetic energy as chemical potential energy in the form of engine-fuel for use when propulsive power is needed. In addition to the types used by rail locomotives, generators suitable for this purpose include the standard engine-driven alternators, driveline generators, and special motor/generators in the wheels of vehicles. When the battery (not shown) is adequately charged, it is preferred to apply the output of a standard or auxiliary automotive generator 380 as provided by controller 370 to electrolyzer 304 at times that the brake petal is applied. This improves vehicle efficiency and performance by recovering stopping energy for use as engine-fuel.

In automotive applications it is often desired to retrofit engines in vehicles that depend upon commonly used vacuum-assisted sub-systems such as wheel or drive-line brakes, windshield wipers, and numerous other conveniences. However, this creates a problem for unthrottled air intake which is the preferred mode of operation because the intake system no longer produces a vacuum. Actuator 348 controls air valve 350 preferably at times that brakes are applied to produce a vacuum in line 356 to assist actuation of a representative vacuum-assisted device 358 as shown. Vacuum storage in accumulator 354 is monitored by a suitable pressure transducer 355 to allow controller 370 to determine the frequency and degree of application of valve 350 as required to maintain the desired pressure difference for the type of driving undertaken at any time. Check valve 357 retains accumulated vacuum as shown.

For instance, if vacuum assisted wind-shield wipers are used controller 370 will maintain the required vacuum in 354 by more frequent or more extensive restriction of air entry to the engine past valve 350. The preferred time of application of valve 350 would be during vehicle stopping or deceleration events. However, controller 370 will provide use of valve 350 as necessary to maintain safe driving conditions in correlation with the optimization parameters disclosed for control of 40 with respect to engine power, emissions, and fuel economy. A normally-closed dump valve 359 relieves compressor 302 as needed until more efficient operation is resumed. At times that fuel pressure is insufficient, illustratively due to fuel-storage depletion or failure of the fuel-pressurization system, to allow direct injection of fuel to the compression chamber it is preferred to actuate valve 350 to reduce air entry to the engine to reduce compression pressure and if this does not allow satisfactory engine performance to deliver fuel to the combustion chamber during intake conditions. In many engines, delivery of the fuel during intake conditions may require continuous actuation of valve 350 in proportion to the amount of fuel delivered to produce a more or less homogeneous air-fuel mixtures until fuel pressure is restored sufficiently to allow preferred operation at stratified-charge conditions.

Hot hydrogen and oxygen exiting electrolyzer 304 are cooled by preheating entering water in heat exchanger assembly 306 as shown. It is preferred to insulate electrolyzer 304 with high temperature rock wool or similar materials to keep inventories of electrolyte molten for hours after shut down of the engine. This provides for recovery of waste heat as chemical potential energy through elevated temperature electrolysis. Hydrogen is stored in pressure accumulator 314.

Storage pressure of hydrogen is determined by the pressure maintained by pump 346. This balances the pressure across membrane 310 at a typical storage pressure of about 140 atmospheres. Regulation of hydrogen pressure to spark-injector 40 is preferably accomplished primarily by solenoid valve 322 which is opened when the pressure is below a set point and closed when the pressure reaches a set point Another conventional pressure regulator may be used in series if desired but it is preferred to use at least fail-safe regulator 322. It is preferred to locate pressure regulator 322 inside of accumulator 314 as shown so it cannot be impinged and broken off without destroying accumulator 314 and will fail safe in case of collision. If the vehicle is in a collision and the air bag or safety harness is activated fail-safe valve 322 is returned to the normally-closed condition. Reactivation of pressure regulation requires action by the operator to signal that it is safe to continue fuel delivery to spark-injector 40. A suitable action would be to reset a switch.

Using off-peak electricity to generate clean hydrogen transportation fuel is an especially opportune way for existing electric generating capacity to help solve the problem of air pollution. Off-peak wind, wave, falling-water and other forms of renewable electric power are especially desired for an embodiment of the invention that gets the car ready for daily use of hydrogen while the car is parked. The parked vehicle is manually or automatically coupled by suitable contact wiring or inductive coupling to an electricity supply. Electrolyzer 304 may be heated by application of alternating or direct current to electrodes 316/318 and 320/318 for suitable warm-up.

After reaching the desired temperature, direct current is applied between electrodes 308 and 312 (positive) and 310 (negative). Pump 346 is activated to supply fluids to the center chamber of 304 through tube 364. Pump 346 delivers fluids from 331 to heat exchanger 306, to 364, and maintains pressure equilibrium across 310 at the instantaneous hydrogen storage pressure. Normally open solenoid valve 362 is actuated to closed position and opened intermittently in coordination with pressure regulating valve 322 to maintain the instantaneous hydrogen storage pressure balance by allowing bleed off of oxygen to the inlet of the engine as shown. It is preferred in normally aspirated engines to bleed this oxygen into the inlet at a point as close to the combustion chamber as possible. It is preferred to bring the temperature of 304 to the upper limit of temperature while on parked charge so that when the vehicle starts operating it will be ready to accept conversion of stopping energy as stored hydrogen. This can be done by programming the parked vehicle charging system to charge the hydrogen accumulator to within about 10 percent of the maximum storage pressure as soon as the car is parked in order to take advantage of the heat accumulated in 304. A suitable programmable timer is a Grainger Stock No. 685. Near the expected end of the programmed park period the electrolyzer is reheated and the accumulator is charged to the design pressure to be ready for at least starting and warming the engine on hydrogen before introducing a fuel containing carbon.

This mode of operation reduces unwanted exhaust emissions by up to 50 percent. For many motorists in stop and go traffic, the vehicle would be operated on hydrogen without the use of fossil fuels. This mode of operation reduces unwanted emissions by almost 100%. It is preferred to operate the combustion engine with the special water-condensing turbocharger shown which consists of compressor 302, drive shaft 324, turbo-motor 326, stator 328, and turbo-motor 330. Condensed water is collected in centrifugal separator 332 and delivered to reservoir 331 as shown. Exhaust gases pass around electrolyzer 304 in a helical path as shown in section at 334, 336, 338, 340, and 342. This provides heat to electrolyzer 304 and helps insulate 304. Final insulation (not shown) is placed on the outside of the assembly to conserve heat It is preferred to use a vacuum jacketed insulation system like the venerable thermos bottle.

Exhaust gases enter the atmosphere through 376 as shown. It is anticipated that in certain applications, the embodiments of FIGS. 9 and 10 will be used in conjunction with the embodiments of FIGS. 7 or 8. The present invention assists virtually any fuel by improved combustion efficiency. The embodiments of FIGS. 2–10 can be used independently or in conjunction with standard fuel metering equipment such as diesel fuel injectors, carburetors, throttle body injectors, and port injectors such as 390 from fuel line 392. In this instance it is generally preferred to operate at "lean burn" conditions that are too lean for spark ignition.

Although it is generally preferred to burn all of the fuel on a stratified basis, it has been found that using hydrogen produced by the embodiments of FIGS. 4–10 and delivered by the embodiment of FIG. 9 dramatically improves combustion efficiency and power ratings of more inert traditional hydrocarbon fuels delivered by standard systems. This process of characterizing the combustion of more inert conventional fuels by the hydrogen-torch effect is valuable even at 2 percent or less heat delivery from the hydrogen Using hydrogen to stimulate combustion of hydrocarbon fuels allows leaner burning of fuels than could be ignited by conventional spark plug approaches and increases the rate of molecular-cracking processes in which large hydrocarbons are broken into smaller fragments. Expediting production of smaller molecular fragments is beneficial in increasing the surface to-volume ratio and consequent exposure to oxygen for completion of the combustion process. Improvements similar to those shown in Table 1 for methane-hydrogen mixtures are possible when hydrogen is used as a combustion stimulant with other hydrocarbons such as methanol, ethanol, gasoline, and diesel fuel. This is especially advantageous in lean-burn conditions. It is preferred to use 100 percent hydrogen on cold start, idle, and in polluted cities and to use engine-fuel or hydrogen-boosted fossil fuel if necessary for greater range.

Hydrogen burns in excess air to produce water vapor and very limited amounts of $NO_x$ depending upon the peak temperature of combustion as controlled by the optimization objective of controller 370. Worthy reductions in emissions of $NO_x$, $CO_2$, CO, $HC_x$, and $SO_2$, and particulates are possible when hydrogen is used as a substitute for nearly any portion of gasoline and diesel fuel. Tables 1 and 2 show comparisons of emissions from vehicles using the invention with various percentages of hydrogen and other fuels. It shows that relatively small amounts of hydrogen can dramatically reduce exhaust emissions of atmospheric pollutants and achieve stringent exhaust emission limits. As shown in Table 1, ultimately clean exhaust conditions can be met by increasing the percentage of hydrogen or engine-fuel. Use of hydrogen as a cold-start and pilot fuel for land-fill methane, natural gas, and sewer gas is encouraged. Conventional waste disposal practices that release large volumes of harmful greenhouse gases such as methane and carbon dioxide can be replaced by processes that collect renewable hydrogen and methane from landfill and sewage treatment plants for use in cogeneration and transportation applications. Costly waste disposal practices that pollute the environment can become profit centers as clean-burning renewable hydrogen and methane are collected and marketed as renewable fuels that replace diesel and gasoline fuels.

It thus will be understood that the objects of this invention have been fully and effectively accomplished. It will be realized, however that the foregoing preferred specific embodiment has been shown and described for the purpose of illustrating the functional and structural principles of this invention and is subject to change without departure from such principles. Therefore, this invention includes all modifications encompassed within the spirit and scope of the following tables and claims.

TABLE 1

EMISSIONS TEST SUMMARY

| TEST OR STANDARD | EMISSIONS, GRAMS PER MILE* | | |
|---|---|---|---|
| | RHC[1] | CO | NO$_x$ |
| 5% HYDROGEN, 95% METHANE[2] | 0.06 | 1.6 | 0.38 |
| 50% HYDROGEN, 50% METHANE[2] | 0.03 | 0.4 | 0.23 |
| 100% HYDROGEN[2] | 0.0 | 0.0 | 0.18 |
| CALIFORNIA TLEV[3] | 0.125 | 3.4 | 0.4 |
| CALIFORNIA LEV[4] | 0.075 | 3.4 | 0.2 |
| CALIFORNIA ULEV[5] | 0.040 | 1.7 | 0.2 |

NOTES:
[1]. RHC = Reactive Hydrocarbons
[2]. % Hydrogen injected through spark-injector 40
[3]. Transitional Low Emission Vehicle (CARB)
[4]. Low Emission Vehicle (CARB)
[5]. Ultra Low Emission Vehicle (CARB)
*CARB = California Air Resources Board

TABLE 2

FUEL COMBUSTION CHARACTERISTICS

| FUEL | LOWER FLAME LIMIT | UPPER FLAME LIMIT | LOWER HEAT RELEASE (BTU/lb) | HIGHER HEAT RELEASE (BTU/lb) | AIR-FUEL RATIO | FLAME SPEED* (Ft/Sec.) |
|---|---|---|---|---|---|---|
| HYDROGEN | 4% VOL. | 75% VOL. | 51,593 | 61,031 | 34.5 LBS/LB | 30,200 |
| CARBON MONOXIDE | 12 | 74.2 | 4,347 | 4,347 | 2.85 | |
| METHANE | 5.3 | 15 | 21,518 | 23,890 | 17.21 | 4,025 |
| ETHANE | 3 | 12.5 | 20,432 | 22,100 | 16.14 | 4,040 |
| PROPANE | 2.1 | 9.4 | 19,944 | 21,670 | 15.65 | 4,050 |
| BUTANE | 1.8 | 8.4 | 19,679 | 21,316 | 15.44 | 4,060 |
| BENZENE | 1.4 | 7.1 | 17,466 | 18,188 | 13.26 | 4,150 |
| METHANOL | 6.7 | 36.5 | 7,658 | 9,758 | 6.46 | 3,900 |
| ETHANOL | 3.2 | 19 | 9,620 | 12,770 | 8.99 | 4,030 |
| OCTANE | | | 19,029 | 20,529 | 15.11 | 4,280 |
| HEXANE | 1.18 | 7.4 | | | | 4,200 |
| GASOLINE | 1.0 | 7.6 | 18,900 | 20,380 | 14.9 | 4,010 |

*At Atmospheric Pressure

TABLE 3

ENGINE-FUEL PRODUCTION

| REACTANTS | FEEDSTOCKS | ENGINE-FUEL |
|---|---|---|
| Methanol-Ethanol[1]: | $CH_3OH + C_2H_5OH + H_2O \rightarrow$ | $3CO + 6H_2$ - Eqn. 1 |
| Methanol-Allyl Alcohol: | $CH_3OH + C_3H_6OH + 2H_2 \rightarrow$ | $4CO + 7H_2$ - Eqn. 2 |
| Methanol-Propanol: | $CH_3OH + C_3H_7OH + 2H_2O \rightarrow$ | $4CO + 8H_2$ - Eqn. 3 |
| Methanol-Butanol: | $CH_3OH + C_4H_9OH + 3H_2O \rightarrow$ | $5CO + 10H_2$ - Eqn. 4 |
| Ethanol-Amyl Alcohol: | $C_2H_5OH + C_5H_{11}OH + 5H_2O \rightarrow$ | $7CO + 14H_2$ - Eqn. 5 |
| Methanol-Phenol[2]: | $CH_3OH + C_6H_8O + 5H_2O \rightarrow$ | $7CO + 10H_2$ - Eqn. 6 |
| 144-Proof Ethanol: | $C_2H_5OH + H_2O \rightarrow$ | $2CO + 4H_2$ - Eqn. 7 |
| "Black" Methanol (130-Proof): | $C + H_2O + CH_3OH \rightarrow$ | $2CO + 3H_2$ - Eqn. 8 |
| Methane-Steam: | $CH_4 + H_2O \rightarrow$ | $CO + 3H_2$ - Eqn. 9 |
| Gasoline-Wet Methanol[3]: | $C_8H_{18} + CH_3OH + 8H_2O \rightarrow$ | $9CO + 19H_2$ - Eqn. 10 |
| Diesel-Wet Methanol: | $C_9H_{20} + CH_3OH + 9H_2O \rightarrow$ | $10CO + 21H_2$ - Eqn. 11 |
| Cyanoacetic Acid[4] | $C_3H_3NO_2 + H_2O \rightarrow$ | $3CO + 2.5H_2 + .5N_2$ - Eqn. 12 |
| Ammonia | $2NH_3 \rightarrow$ | $N_2 + 3H_2$ - Eqn. 13 |
| Ammonium Hydroxide[5] | $2NH_4OH \rightarrow$ | $N_2 + 3H_2 + 2H_2O$ - Eqn. 14 |

NOTES:
[1]. Equation 1 illustrates the opportunity to utilize greater biomass alcohol yields such as methanol from destructive distillation of ligno-cellulosic materials and fermentation of starches. Considerable water can be left in the crude alcohols to reduce refining costs.
[2]. Typical to the variety of compounds in partially-refined biomass and coal-tar fuels.
[3]. "Gasoline" typical to a mixture of components such as undecane, decane, nonane, octane, heptane, hexane, pentane, benzene, toluene, and (occasionally) fuel alcohols.
[4]. Typical to the variety of cyanocarbons and cyano-organic compounds.
[5]. Typical to the variety of ammonium compounds.

TABLE 4

CATALYTIC MATERIAL SYSTEMS

| BASE mat'l | CAT. mat'l | Ag* | Cu* | An* | Sn* | Si* | Mg* | Cd* | Al* | T.S. PSI | Y.S. PSI | ELG. % | Melt °F. |
|---|---|---|---|---|---|---|---|---|---|---|---|---|---|
| — | Alloy Sheet | — | 95% | 5% | — | — | — | — | — | 30000 | 10000 | 40 | |
| — | Alloy Sheet | — | 80% | 20% | — | — | — | — | — | 38000 | 12000 | 52 | |
| — | Alloy Sheet | — | 70% | 30% | — | — | — | — | — | 40000 | 11000 | 85 | |
| — | Alloy Sheet | — | 70% | 26% | 2% | — | — | — | — | 53000 | 22000 | 63 | |
| — | Alloy Sheet | — | 60% | 35% | 1% | 1% | — | — | 3% | 58000 | 25000 | 45 | |
| Fe*² | Hot Dip Coat | — | 57% | 42% | 1% | — | — | — | — | — | — | — | 1640 |
| Cu*³ | Hot Dip Coat | 45% | 15% | 16% | — | — | — | 24% | — | — | — | — | 1135 |
| Al*⁴ | Hot Dip Coat | | 3% | 6% | — | 5% | 60% | — | 25% | — | — | — | 940 |
| Fe | Hot Dip Coat | 7% | 48% | 38% | 1% | 1% | 1% | 2% | 2% | | | | 1485 |
| Fe*¹ | Hot Dip Coat | 10% | 60% | 25% | | | | | | | | | 1205 |
| Fe | Hot Dip Coat | | 22% | 48% | | 1% | | 27% | 2% | | | | 1120 |

NOTES:
*= Composition of Catalysts
*²= Fe = low alloy and stainless steels
*³= Cu = Including brass, bronze, and monel alloys
*⁴= Al = Aluminum alloys
*¹= Plus 5% Phosphorus
Processing of Hot Dip Coatings May Require Inert, Vacuum, or Hydrogen Furnace Atmospheres

What is claimed is:

1. A heat engine energy conversion process including expanding means for expansion of a gaseous inventory to do useful work on a moveable output means of said engine and including exhausting means for expelling the exhaust from said engine, the improvement comprising:
   first heat exchanging means for heating a fluid,
   reacting means for reacting said fluid to produce at least one derivative of said fluid,
   second heat exchanging means for removal of substantial amounts of heat from said at least one derivative thereof, and imputing means for adding said fluid and said at least one derivative thereof to said expanding means for expansion,
   said imputing means for adding said fluid and said at least one derivative thereof includes igniting means selected from the group including spark plasma, catalytic surface, heated surface, and ionizing radiation means.

2. The energy conversion process of claim 1 wherein said fluid is selected from the group including a fuel, an oxidant, an oxidant donor, and a hydrogen donor.

3. The energy conversion process of claim 1 wherein a substantial amount of said fluid is extracted from said exhaust of said engine.

4. The energy conversion process of claim 1 wherein said fluid is substantially comprised of a fuel and an oxygen donor in substantially stoichiometric ratio for reaction to form said at least one derivative without substantial amounts of said fuel or oxygen donor left over.

5. The energy conversion process of claim 1 wherein said fluid is substantially comprised of an oxygen donor extracted from said exhaust of said heat engine.

6. The energy conversion process of claim 1 wherein a substantial amount of said fluid includes ingredients extracted from said exhaust of said heat engine and said substantial amount of said fluid is held in storage prior to participation in said energy conversion process.

7. The energy conversion process of claim 1 wherein a portion of the inventory of said fluid is extracted from said exhaust by means selected from the group including an electric motor driven exducer means, a motor means that extracts work from said expelled exhaust of said engine, and a motor means that extracts work from said expelled exhaust of said engine and delivers substantial work to a compressing means for compressing air added to said engine.

8. The energy conversion process of claim 1 wherein said heat engine includes an engine cooling means that is included with said means for removing substantial amounts of heat from said at least one derivative thereof.

9. The energy conversion process of claim 1 wherein said means for removal of substantial amounts of heat from said at least one derivative thereof includes a substantial inventory of fuel that is used by said engine.

10. The energy conversion process of claim 1 wherein said means for removal of substantial amounts of heat from said at least one derivative thereof includes a substantial inventory of fuel that is used by said engine and said heat removal by said fuel is by countercurrent flowing means.

11. The energy conversion process of claim 1 wherein said reacting means includes energy addition from energy conversion sources selected from the group including fuel oxidation, catalytic processes, electrical heating, and electrolysis.

12. The energy conversion process of claim 1 wherein said process includes at least a second imputing means for adding to said engine a fluid selected from the group including an oxidant, said fluid, and said at least one derivative thereof.

* * * * *